United States Patent
Chen et al.

(10) Patent No.: US 12,465,216 B2
(45) Date of Patent: Nov. 11, 2025

(54) DIFFUSION KURTOSIS IMAGING METHOD, COMPUTER DEVICE AND STORAGE MEDIUM

(71) Applicant: SHANGHAI UNITED IMAGING HEALTHCARE Co., LTD., Shanghai (CN)

(72) Inventors: Xiang Chen, Shanghai (CN); Zhen-Huan Gong, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 467 days.

(21) Appl. No.: 17/971,816

(22) Filed: Oct. 24, 2022

(65) Prior Publication Data
US 2023/0200653 A1    Jun. 29, 2023

(30) Foreign Application Priority Data
Dec. 29, 2021   (CN) .......................... 202111646990.2

(51) Int. Cl.
*A61B 5/00* (2006.01)
*G01R 33/563* (2006.01)

(52) U.S. Cl.
CPC ...... *A61B 5/0042* (2013.01); *G01R 33/56341* (2013.01); *G06T 2207/30016* (2013.01)

(58) Field of Classification Search
CPC ............ A61B 5/0042; G01R 33/56341; G01R 33/565; G06T 2207/30016
See application file for complete search history.

(56) References Cited

U.S. PATENT DOCUMENTS

2012/0002851 A1    1/2012  Jensen et al.
2013/0279771 A1*  10/2013  Wang .................. A61B 5/4082
                                                            382/128
2015/0022210 A1    1/2015  Yokosawa et al.
(Continued)

FOREIGN PATENT DOCUMENTS

CN        104323777 A    2/2015
CN        104471426 A    3/2015
(Continued)

OTHER PUBLICATIONS

European Search Report for European Application No. 22197844.8 dated May 2, 2023 (12 pages).
(Continued)

*Primary Examiner* — Ming Y Hon
*Assistant Examiner* — Amanda H Pearson

(57) ABSTRACT

The disclosure provides a diffusion kurtosis imaging method, which includes acquiring scan image signals of a scanned object; fitting the scan image signals using an unconstrained optimization algorithm to obtain elements of a first diffusion tensor and elements of a first kurtosis tensor; determining at least one type of parameters of diffusion tensor imaging parameters or kurtosis tensor imaging parameters based on the elements of the first diffusion tensor and the elements of the first kurtosis tensor; and generating a parameter image based on the at least one type of parameters of diffusion tensor imaging parameters or kurtosis tensor imaging parameters.

20 Claims, 6 Drawing Sheets

(56) References Cited

U.S. PATENT DOCUMENTS

| | | | | |
|---|---|---|---|---|
| 2015/0055845 A1* | 2/2015 | Jensen | ............... | G01R 33/5608 382/131 |
| 2018/0306885 A1 | 10/2018 | Huwer et al. | | |
| 2020/0379072 A1 | 12/2020 | Basser et al. | | |
| 2022/0034985 A1* | 2/2022 | Maier | ................ | G01R 33/5602 |

FOREIGN PATENT DOCUMENTS

| | | | |
|---|---|---|---|
| CN | 106199473 A | 12/2016 | |
| CN | 107219483 A | 9/2017 | |
| CN | 112581385 A | 3/2021 | |

OTHER PUBLICATIONS

Zhang Fan et al: "MK-Curve improves sensitivity to identify white matter alterations in clinical high risk for psychosis", Neuroimage, Elsevier, Amsterdam, NL, vol. 226, Dec. 4, 2020 (Dec. 4, 2020), XP086446295.

First Office Action (CN Application No. 2021116469902), dated Oct. 18, 2024, 7 pages.

Chinese Office Action (CN Application No. 202111643462.1), dated Apr. 27, 2025, 7 pages.

\* cited by examiner

DIFFUSION KURTOSIS IMAGING METHOD, COMPUTER DEVICE AND STORAGE MEDIUM

CROSS-REFERENCE TO RELATED APPLICATIONS

The present application claims the priority to Chinese Patent Application No. 202111646990.2, filed on Dec. 29, 2021, which is incorporated by reference herein in its entirety.

TECHNICAL FIELD

The present disclosure relates to the field of diffusion kurtosis imaging, and particularly to a diffusion kurtosis imaging method, computer device and storage medium.

BACKGROUND

With the development of magnetic resonance parameter imaging technology, diffusion kurtosis imaging (DKI) has emerged and is widely used in the identification of acute cerebral infarction, other acute brain lesions and tumors in various parts of human body. DKI uses the non-Gaussian diffusion model, which is more consistent with the actual diffusion properties of water molecules in tissues and thus more suitable for describing microscopic structural changes of tissues.

In the related art, constrained optimization algorithms are used to calculate elements of the diffusion tensor and elements of the kurtosis tensor, to obtain parameters based on the elements of the diffusion tensor and the elements of the kurtosis tensor, and to generate parameter images based on the parameters.

However, the existing method of generating parameter images based on the constrained optimization algorithms requires time-consuming calculation.

SUMMARY

One aspect of the present disclosure provides a diffusion kurtosis imaging method, including acquiring scan image signals of a scanned object; fitting the scan image signals using an unconstrained optimization algorithm to obtain elements of a first diffusion tensor and elements of a first kurtosis tensor; determining at least one type of parameters of diffusion tensor imaging parameters or kurtosis tensor imaging parameters based on the elements of the first diffusion tensor and the elements of the first kurtosis tensor; and generating a parameter image based on the at least one type of parameters of diffusion tensor imaging parameters or kurtosis tensor imaging parameters.

Another aspect of the present disclosure provides a computer device including a memory and a processor. The memory has computer instructions stored thereon. The processor, when executing the computer instructions, is configured to: acquire scan image signals of a scanned object; fit the scan image signals using an unconstrained optimization algorithm to obtain elements of a first diffusion tensor and elements of a first kurtosis tensor; determine at least one type of parameters of diffusion tensor imaging parameters or kurtosis tensor imaging parameters based on the elements of the first diffusion tensor and the elements of the first kurtosis tensor; and generate a parameter image based on the at least one type of parameters of diffusion tensor imaging parameters or kurtosis tensor imaging parameters.

Yet another aspect of the present disclosure provides a computer readable storage medium having computer instructions stored thereon. The computer instructions, when executed by a processor, cause the processor to: acquire scan image signals of a scanned object; fit the scan image signals using an unconstrained optimization algorithm to obtain elements of a first diffusion tensor and elements of a first kurtosis tensor; determine at least one type of parameters of diffusion tensor imaging parameters or kurtosis tensor imaging parameters based on the elements of the first diffusion tensor and the elements of the first kurtosis tensor; and generate a parameter image based on the at least one type of parameters of diffusion tensor imaging parameters or kurtosis tensor imaging parameters.

Details of one or more embodiments of the present disclosure are set forth in the accompanying drawings and description below. Other features, objects, and advantages of the disclosure will become apparent from the description, the drawings, and the claims.

DETAILED DESCRIPTION

In order to make the objectives, technical solutions and advantages of the present disclosure more clear, the present disclosure will be further described in detail with reference to the accompanying drawings and embodiments. It should be understood that the specific embodiments described herein are intended only to explain the present disclosure, but not intended to limit the present disclosure.

Figure 1:
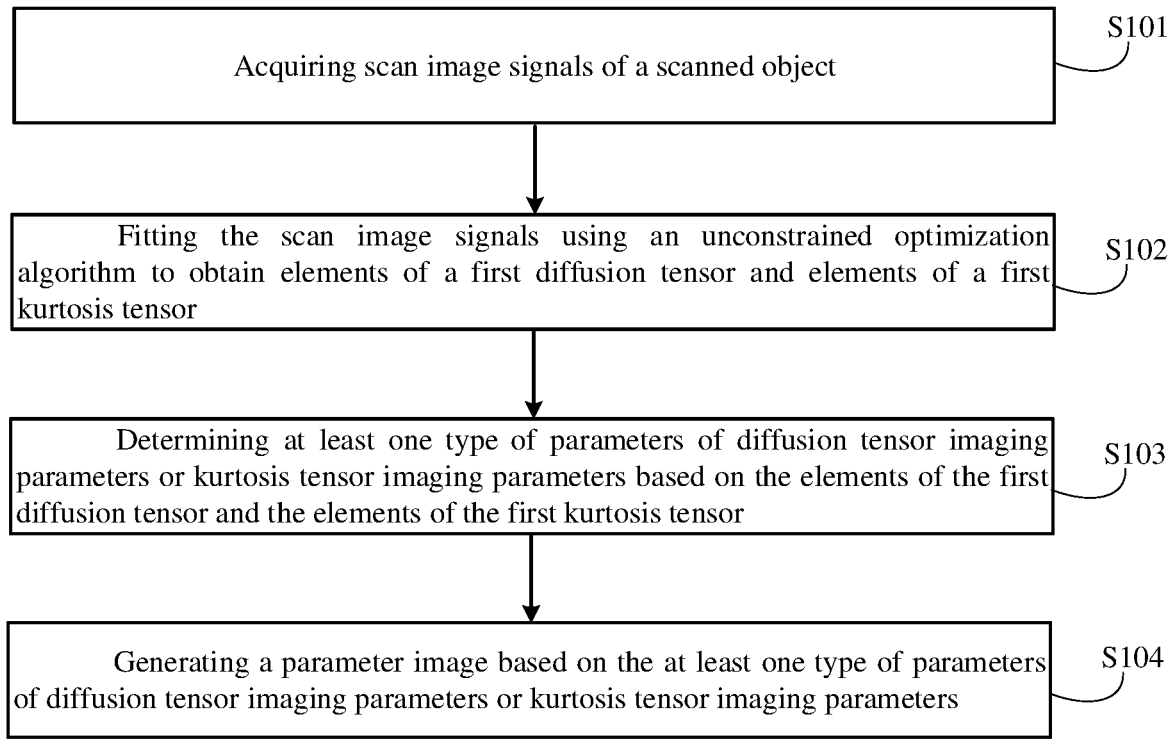
FIG. 1 is a schematic flow chart of a diffuse kurtosis imaging method according to an embodiment of the present disclosure.

Referring to FIG. 1, which is a schematic flow chart of a diffusion kurtosis imaging method according to an embodiment of the present disclosure, the method includes the following steps:

S101, acquiring scan image signals of a scanned object;

The scan image signals may include image signals in multiple directions with diffusion intensity. Alternatively, the scan image signals include an image signal without diffusion intensity and image signals in multiple directions with diffusion intensity. The description "with diffusion intensity" means that the b value that represents the diffusion intensity is not equal to zero, and the description "without diffusion intensity" means that the b value is equal to zero.

S102, fitting the scan image signals using an unconstrained optimization algorithm to obtain elements of a first diffusion tensor and elements of a first kurtosis tensor;

For example, based on the model indicated by formulas (1) to (11) below, an unconstrained optimization algorithm can be used to fit the scan image signals to obtain the elements of the first diffusion tensor and the elements of the first kurtosis tensor.

$$\ln\left(\frac{S_{(n,b)}}{S_0}\right) = -b \times \sum_{i=1}^{3}\sum_{j=1}^{3} n_i n_j D_{ij} + \quad (21)$$

$$\frac{1}{6} \times b^2 \times \overline{D}^2 \times \sum_{i=1}^{3}\sum_{j=1}^{3}\sum_{k=1}^{3}\sum_{l=1}^{3} n_i n_j n_k n_l W_{ijkl}$$

Diffusion coefficients in each direction $D(n)$: $D(n) = \sum_{i=1}^{3}\sum_{j=1}^{3} n_i n_j D_{ij}$ (2)

Kurtosis coefficients in each direction:

$$K(n): K(n) = \frac{\overline{D}^2}{D(n)^2} \times \sum_{i=1}^{3}\sum_{j=1}^{3}\sum_{k=1}^{3}\sum_{l=1}^{3} n_i n_j n_k n_l W_{ijkl} \quad (3)$$

$$\overline{D} = \frac{1}{3}(D_{11} + D_{22} + D_{33}) \quad (4)$$

Axial diffusion coefficient $AD$: $AD = \lambda_1$ (5)

Radial diffusion coefficient $$RD = \frac{\lambda_2 + \lambda_3}{2} \quad (6)$$

Diffusion fractional anisotropy FA:

$$FA = \sqrt{\frac{1}{2}} \times \frac{\sqrt{(\lambda_1 - \lambda_2)^2 + (\lambda_2 - \lambda_3)^2 + (\lambda_3 - \lambda_1)^2}}{\sqrt{\lambda_1^2 + \lambda_2^2 + \lambda_3^2}} \quad (7)$$

Mean kurtosis coefficient $\overline{K}$:

$$\overline{K} = F_1(\lambda_1, \lambda_2, \lambda_3)\hat{W}_{1111} + F_1(\lambda_2, \lambda_1, \lambda_3)\hat{W}_{2222} + F_1(\lambda_3, \lambda_2, \lambda_1)\hat{W}_{3333} + \quad (8)$$

$$F_2(\lambda_1, \lambda_2, \lambda_3)\hat{W}_{2233} + F_2(\lambda_2, \lambda_1, \lambda_3)\hat{W}_{1133} + F_1(\lambda_3, \lambda_2, \lambda_1)\hat{W}_{1122}$$

$$\hat{W}_{ijkl} = \sum_{i,j,k,l=1}^{3} R_{ii'} R_{jj'} R_{kk'} R_{ll'} W_{i'j'k'l'}$$

$$F_1(\lambda_1, \lambda_2, \lambda_3) = \frac{(\lambda_1 + \lambda_2 + \lambda_3)^2}{18(\lambda_1 - \lambda_2)(\lambda_1 - \lambda_3)}\left[\frac{\sqrt{\lambda_2\lambda_3}}{\lambda_1} R_F\left(\frac{\lambda_1}{\lambda_2}, \frac{\lambda_1}{\lambda_3}, 1\right) + \frac{3\lambda_1^2 - \lambda_1\lambda_2 - \lambda_1\lambda_3 - \lambda_2\lambda_3}{3\lambda_1\sqrt{\lambda_2\lambda_3}} R_D\left(\frac{\lambda_1}{\lambda_2}, \frac{\lambda_1}{\lambda_3}, 1\right) - 1\right]$$

$$F_2(\lambda_1, \lambda_2, \lambda_3) = \frac{(\lambda_1 + \lambda_2 + \lambda_3)^2}{3(\lambda_2 - \lambda_3)^2}\left[\frac{\lambda_2 + \lambda_3}{\sqrt{\lambda_2\lambda_3}} R_F\left(\frac{\lambda_1}{\lambda_2}, \frac{\lambda_1}{\lambda_3}, 1\right) + \frac{2\lambda_1 - \lambda_2 - \lambda_3}{3\lambda_1\sqrt{\lambda_2\lambda_3}} R_D\left(\frac{\lambda_1}{\lambda_2}, \frac{\lambda_1}{\lambda_3}, 1\right) - 2\right]$$

$$R_F(x, y, z) = \frac{1}{2}\int_0^\infty (t+x)^{-1/2} \times (t+y)^{-1/2} \times (t+y)^{-1/2} \times (t+z)^{-1/2} dt$$

$$R_D(x, y, z) = \frac{3}{2}\int_0^\infty (t+x)^{-1/2} \times (t+y)^{-1/2} \times (t+z)^{-3/2} dt$$

Axial kurtosis coefficient $$AK = \frac{(\lambda_1 + \lambda_2 + \lambda_3)^2}{9\lambda_1^2}\hat{W}_{1111} \quad (9)$$

Radial kurtosis coefficient RK:

$$RK = \quad (10)$$

$$G_1(\lambda_1, \lambda_2, \lambda_3)\hat{W}_{2222} + G_1(\lambda_1, \lambda_3, \lambda_2)\hat{W}_{3333} + G_2(\lambda_1, \lambda_2, \lambda_3)\hat{W}_{2233}$$

$$G_1(\lambda_1, \lambda_2, \lambda_3) = \frac{(\lambda_1 + \lambda_2 + \lambda_3)^2}{18\lambda_2(\lambda_2 - \lambda_3)^2}\left(2\lambda_2 + \frac{\lambda_3^2 - 3\lambda_2\lambda_3}{\sqrt{\lambda_2\lambda_3}}\right)$$

$$G_2(\lambda_1, \lambda_2, \lambda_3) = \frac{(\lambda_1 + \lambda_2 + \lambda_3)^2}{3(\lambda_2 - \lambda_3)^2}\left(\frac{\lambda_2 + \lambda_3}{\sqrt{\lambda_2\lambda_3}} - 2\right)$$

Kurtosis anisotropy $$KA = \sqrt{\frac{3}{2}} \times \frac{\sqrt{(K_1 - K)^2 + (K_2 - K)^2 + (K_3 - K)^2}}{\sqrt{K_1^2 + K_2^2 + K_3^2}} \quad (11)$$

$$K_i = \frac{\overline{D}^2}{D(n)^2} \times \sum_{i=1}^{3}\sum_{j=1}^{3}\sum_{k=1}^{3}\sum_{l=1}^{3} v_i v_j v_k v_l W_{ijkl}$$

$$K = \frac{(K_1 + K_2 + K_3)}{3}$$

$S_{(n,b)}$ represents an MR (magnetic resonance) signal intensity scanned in the direction vector n with a b value of the diffusion intensity not equal to 0. $S_0$ represents an MR signal intensity scanned in the direction vector n with a b value of the diffusion intensity equal to 0.

$n_i$ represents a component of the direction vector n on a coordinate axis, for example, $n_1$ represents the component of the direction vector n on the x-axis, $n_2$ represents the component of the direction vector n on the y-axis, and $n_3$ represents the component of the direction vector n on the z-axis.

$\lambda_1, \lambda_2, \lambda_3$ represent the maximum, medium and minimum values of three eigenvalues of the first diffusion tensor $D_{ij}$ respectively.

$R_{ii}$ represents the i-th component of the i-th eigenvector of the first diffusion tensor $D_{ij}$.

$K_i$ in the formula (11) represents the kurtosis coefficient in the direction of the i-th eigenvector of the first diffusion tensor $D_{ij}$.

$v_i$ represents the component in the eigenvector of the first diffusion tensor $D_{ij}$, for example, $v_1$, $v^2$, and $v^3$ represent the three components in the eigenvector of the first diffusion tensor $D_{ij}$, respectively.

$\tilde{W}_{ijkl}$ represents the kurtosis tensor obtained by rotating the first kurtosis tensor $W_{ijkl}$ according to the first diffusion tensor $D_{ij}$.

It should be noted that the first kurtosis tensor $W_{ijkl}$ in the formula (1) is a symmetric fourth-order tensor with 15 independent parameters, and at least 15 nonlinear correlation equations are needed to solve the 15 independent parameters, so images with diffusion intensities in at least 15 directions are required. The first diffusion tensor $D_{ij}$ is a symmetric second-order tensor, so there are 6 independent parameters, and at least 6 nonlinear correlation equations are needed to solve the 6 independent parameters. Therefore, to determine the first diffusion tensor $D_{ij}$; and the first kurtosis tensor $W_{ijkl}$ using the formula (1), images with diffusion intensity in at least 15 directions need to be acquired, and at least 22 images with a b value of diffusion intensity not equal to zero need to be acquired in the at least 15 directions. Alternatively, an image with a b value of diffusion intensity equal to zero and images with diffusion intensity in at least 15 directions need to be acquired, and at least 21 images with a b value of diffusion intensity not equal to zero need to be acquired in the at least 15 directions.

S103, determining at least one type of parameters of diffusion tensor imaging parameters or kurtosis tensor imaging parameters based on the elements of the first diffusion tensor and the elements of the first kurtosis tensor;

At this step, the at least one type of parameters of diffusion tensor imaging parameters or kurtosis tensor imaging parameters can be determined based on the elements of the first diffusion tensor and the elements of the first kurtosis tensor. For example, the formulas (2) to (11) are used to determine the at least one type of parameters of diffusion tensor imaging parameters or kurtosis tensor imaging parameters. The diffusion tensor imaging parameters may include at least one of the diffusion coefficients in each direction, the mean diffusion coefficient, the axial diffusion coefficient, the radial diffusion coefficient, or the diffusion anisotropy coefficient. The kurtosis tensor imaging parameters include at least one of the kurtosis coefficients in each direction, the mean kurtosis coefficient, the axial kurtosis coefficient, the radial kurtosis coefficient, or the kurtosis anisotropy coefficient.

S104, generating a parameter image based on the at least one type of parameters of diffusion tensor imaging parameters or kurtosis tensor imaging parameters;

At this step, the diffusion parameter image may be generated based on the diffusion tensor imaging parameters. For example, a mean diffusion parameter image can be generated based on the mean diffusion coefficient of the diffusion tensor imaging parameters. In another example, an axial diffusion parameter image can be generated based on the axial diffusion coefficient.

A kurtosis parameter image can be generated based on the kurtosis tensor imaging parameters. For example, a mean kurtosis parameter image can be generated based on the mean kurtosis coefficient in the kurtosis tensor imaging parameters. In another example, an axial kurtosis parameter image can be generated based on the axial kurtosis coefficient.

According to the diffusion kurtosis imaging method of this embodiment, the elements of the first diffusion tensor and the elements of the first kurtosis tensor are obtained by acquiring the scan image signals of the scanned object and fitting the scan image signals using an unconstrained optimization algorithm. The at least one type of parameters of diffusion tensor imaging parameters or kurtosis tensor imaging parameters are determined based on the elements of the first diffusion tensor and the elements of the first kurtosis tensor. The parameter image is generated based on the at least one type of parameters of diffusion tensor imaging parameters or kurtosis tensor imaging parameters. Since the unconstrained optimization algorithm requires a short calculation time and has a higher computation efficiency, it takes a relatively short time to obtain the elements of the first diffusion tensor and the elements of the first kurtosis tensor based on the unconstrained optimization algorithm in this embodiment, thereby improving the efficiency of the generation of the parameter image and reducing the computation time for the generation of the parameter image.

Figure 2:
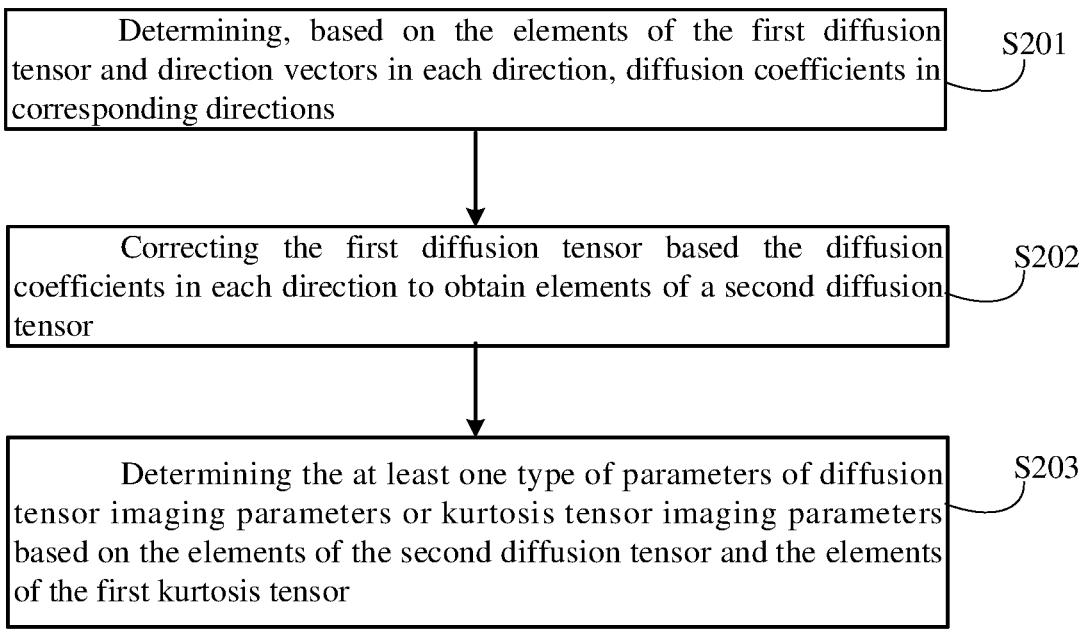
FIG. 2 is a first schematic flow chart of a method for determining imaging parameters according to an embodiment of the present disclosure.

Referring to FIG. 2, which is a first schematic flow chart of the method for determining imaging parameters according to an embodiment of the present disclosure, this embodiment relates to a way of determining at least one type of parameters of diffusion tensor imaging parameters or kurtosis tensor imaging parameters by correcting only the elements of the diffusion tensor. This embodiment relates to an optional implementation regarding how to determine at least one type of parameters of diffusion tensor imaging parameters or kurtosis tensor imaging parameters based on the elements of the first diffusion tensor and the elements of the first kurtosis tensor. According to this embodiment, the step S103 includes the following steps:

S201, determining, based on the elements of the first diffusion tensor and direction vectors in each direction, diffusion coefficients in corresponding directions;

Based on the determined elements of the first diffusion tensor using the unconstrained optimization algorithm and the direction vectors in each direction, the diffusion coefficients in the corresponding directions can be determined. For example, the diffusion coefficients in the corresponding directions can be obtained by forward calculation of the formula (2). The mean diffusion coefficient, the axial diffusion coefficient, the radial diffusion coefficient, and the diffusion fractional anisotropy can also be calculated using the formulas (4) to (7), respectively.

S202, correcting the first diffusion tensor based the diffusion coefficients in each direction to obtain elements of a second diffusion tensor;

At this step, the elements of the second diffusion tensor are obtained by correcting the first diffusion tensor based on the diffusion coefficients in each direction. For example, the elements of the second diffusion tensor can be obtained using the formula (2).

S203, determining the at least one type of parameters of diffusion tensor imaging parameters or kurtosis tensor imaging parameters based on the elements of the second diffusion tensor and the elements of the first kurtosis tensor.

In this embodiment, the diffusion coefficients in corresponding directions are determined based on the elements of the first diffusion tensor and the direction vectors in each direction. The elements of the second diffusion tensor are obtained by correcting the first diffusion tensor based on the diffusion coefficients in each direction. Further, the at least one type of parameters of diffusion tensor imaging parameters or kurtosis tensor imaging parameters are determined based on the elements of the second diffusion tensor and the elements of the first kurtosis tensor. The first diffusion tensor determined by the unconstrained optimization algorithm is thus corrected, which ensures the accuracy of the obtained elements of the second diffusion tensor, thereby improving the accuracy of the determined at least one type of parameters of diffusion tensor imaging parameters or kurtosis tensor imaging parameters.

Figure 3:
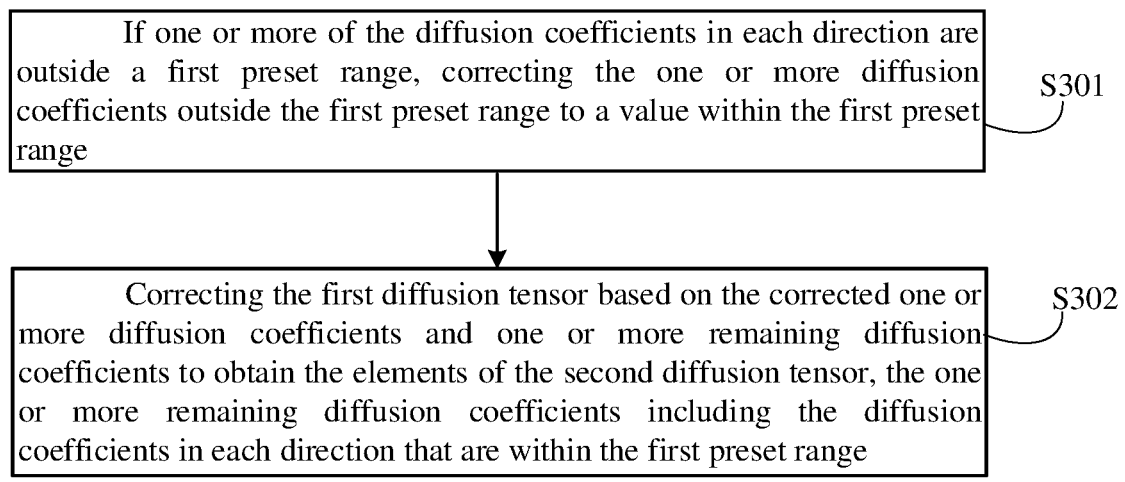
FIG. 3 is a schematic flow chart of a method for obtaining elements of a second diffusion tensor according to an embodiment of the present disclosure.

Referring to FIG. 3 which is a schematic flow chart of a method for obtaining elements of a second diffusion tensor according to an embodiment of the present disclosure, this embodiment relates to an optional implementation regarding how to obtain the elements of the second diffusion tensor by correcting the first diffusion tensor based on the diffusion coefficients in each direction. According to this embodiment, the step S202 includes the following steps:

S301, if one or more of the diffusion coefficients in each direction are outside a first preset range, correcting the one or more of the diffusion coefficients outside the first preset range to a value within the first preset range;

The first preset range is indicated by [first preset threshold, second preset threshold]. The first preset threshold may be equal to zero or other values. The second preset threshold is greater than the first preset threshold. The first preset threshold and the second preset threshold may be determined based on clinical experience. [first preset threshold, second preset threshold] represents a range from a first preset threshold to a second preset threshold, i.e. greater than or equal to the first preset threshold and smaller than or equal to the second preset threshold. The expressions similar to [first preset threshold, second preset threshold] in this disclosure have similar meanings to that indicated by [first preset threshold, second preset threshold]. If one or more of the diffusion coefficients in each direction determined by the unconstrained optimization algorithm are outside the first preset range, the one or more of the diffusion coefficients outside the first preset range are corrected to a value within the first preset range, thereby ensuring that the final obtained diffusion coefficients in each direction are all within the first preset range.

In an embodiment, if one or more of the diffusion coefficients in each direction are smaller than the first preset threshold, the one or more of the diffusion coefficients smaller than the first preset threshold can be corrected to any value within the first preset range. If one or more of the diffusion coefficients in each direction are greater than the second preset threshold, the one or more of the diffusion coefficients greater than the second preset threshold can be corrected to any value within the first preset range.

For example, if one or more of the diffusion coefficients in each direction are smaller than the first preset threshold, the one or more of the diffusion coefficients smaller than the first preset threshold can be corrected to be equal to the first preset threshold. If one or more of the diffusion coefficients in each direction are greater than the second preset threshold, the one or more of the diffusion coefficients greater than the second preset threshold can be corrected to be equal to the second preset threshold.

It will be understood that correcting diffusion coefficients or kurtosis coefficients to a value within a certain range as described herein and hereafter does not necessarily mean that these coefficients are assigned a same value, but they can be assigned different values within the certain range, respectively.

S302, correcting the first diffusion tensor based on the corrected one or more of the diffusion coefficients and one or more remaining diffusion coefficients to obtain the elements of the second diffusion tensor, the one or more remaining diffusion coefficients including the diffusion coefficients in each direction that are within the first preset range.

The first diffusion tensor is corrected to obtain the elements of the second diffusion tensor using the formula (2), i.e., a new diffusion tensor is obtained as the second diffusion tensor by reverse calculation of the formula (2).

In this embodiment, if one or more of the diffusion coefficients in each direction are outside the first preset range, the one or more of the diffusion coefficients outside the first preset range are corrected to a value within the first preset range, and the first diffusion tensor is corrected based on the corrected one or more of the diffusion coefficients and the one or more remaining diffusion coefficients to obtain the elements of the second diffusion tensor. It means that the diffusion coefficients based on which the first diffusion tensor is corrected are all within the first preset range, thereby ensuring the accuracy of the correction of the first diffusion tensor, and thus the accuracy of the obtained elements of the second diffusion tensor.

Figure 4:
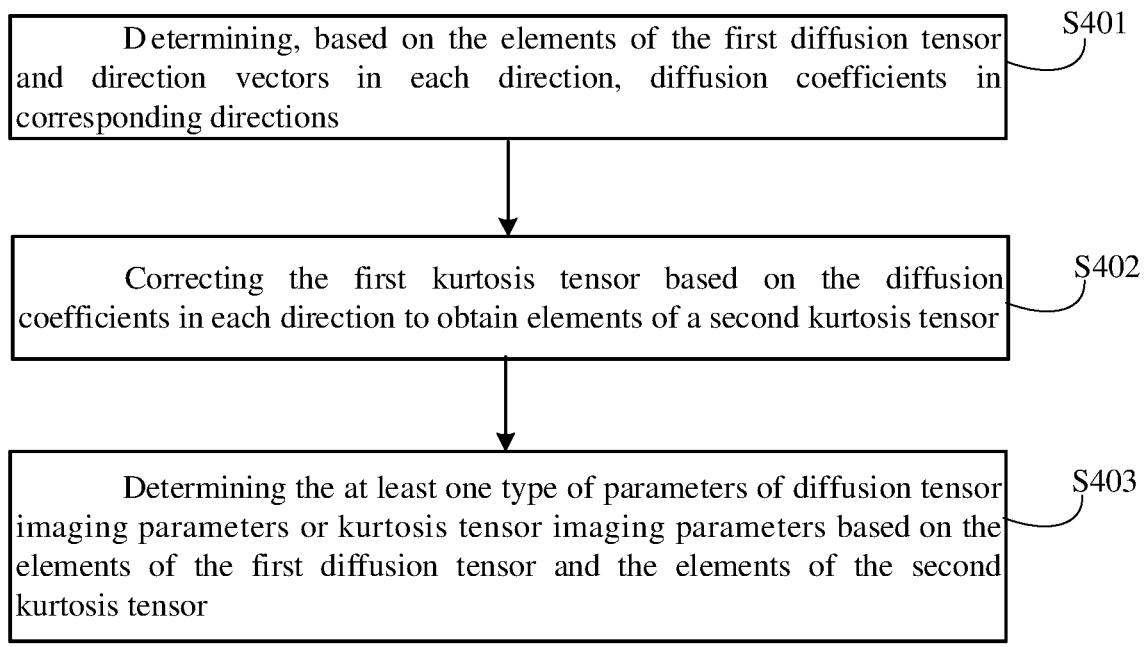
FIG. 4 is a second schematic flow chart of a method for determining imaging parameters according to an embodiment of the present disclosure.

Referring to FIG. 4, which is a second schematic flow chart of the method for determining imaging parameters according to an embodiment of the present disclosure, this embodiment relates to a way of determining at least one type of parameters of diffusion tensor imaging parameters or kurtosis tensor imaging parameters by correcting only the elements of the kurtosis tensor. This embodiment relates to an optional implementation regarding how to determine at least one type of parameters of diffusion tensor imaging parameters or kurtosis tensor imaging parameters based on the elements of the first diffusion tensor and the elements of the first kurtosis tensor. According to this embodiment, the step S103 includes the following steps:

S401, determining, based on the elements of the first diffusion tensor and direction vectors in each direction, diffusion coefficients in corresponding directions;

S402: correcting the first kurtosis tensor based on the diffusion coefficients in each direction to obtain elements of a second kurtosis tensor; and S403: determining the at least one type of parameters of diffusion tensor imaging parameters or kurtosis tensor imaging parameters based on the elements of the first diffusion tensor and the elements of the second kurtosis tensor.

In this embodiment, the diffusion coefficients in the corresponding directions are determined based on the elements of the first diffusion tensor and the direction vectors in each direction. The elements of the second kurtosis tensor are obtained by correcting the first kurtosis tensor based on the diffusion coefficients in each direction. Further, the at least one type of parameters of diffusion tensor imaging parameters or kurtosis tensor imaging parameters are determined based on the elements of the first diffusion tensor and the elements of the second kurtosis tensor. The first kurtosis tensor determined by the unconstrained optimization algorithm is thus corrected to ensure the accuracy of the elements of the second kurtosis tensor, thereby improving the accuracy of the determined at least one type of parameters of diffusion tensor imaging parameters or kurtosis tensor imaging parameters.

Figure 5:
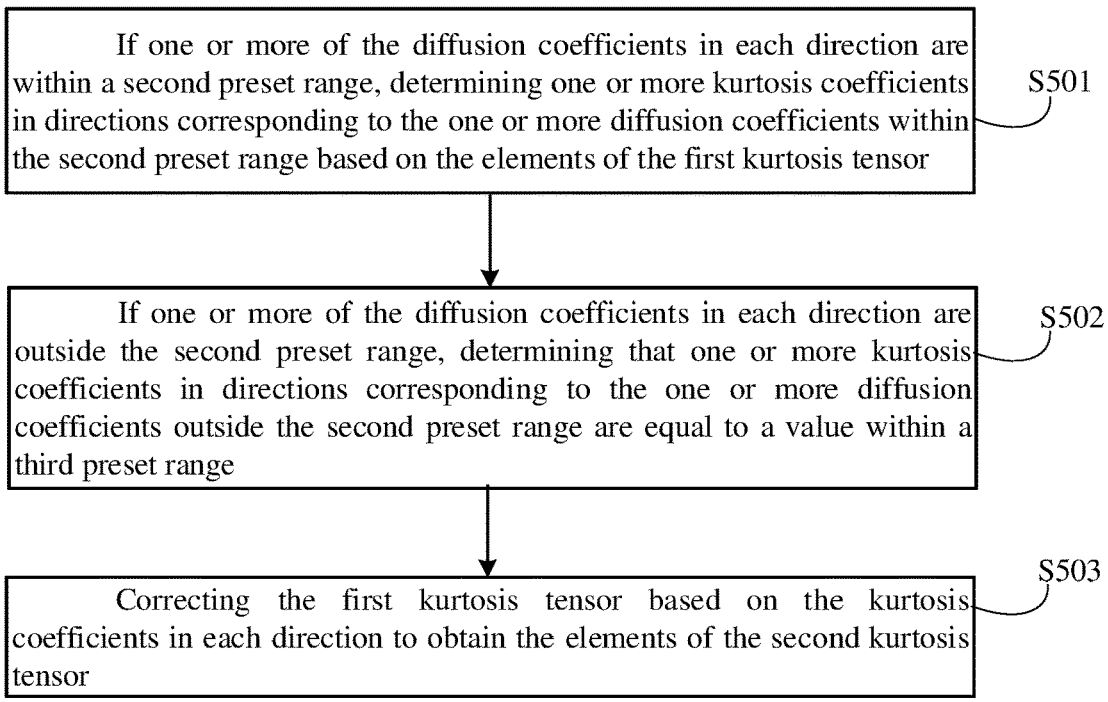
FIG. 5 is a schematic flow chart of a method for obtaining elements of a second kurtosis tensor according to an embodiment of the present disclosure.

Referring to FIG. 5, which is a schematic flow chart of the method for obtaining the elements of the second kurtosis tensor according to an embodiment of the present disclosure, this embodiment relates to an optional implementation regarding how to obtain the elements of the second kurtosis tensor by correcting the first kurtosis tensor based on the diffusion coefficients in each direction. According to this embodiment, the step S402 includes the following steps:

S501, if one or more of the diffusion coefficients in each direction are within a second preset range, determining one or more kurtosis coefficients in directions corresponding to the one or more of the diffusion coefficients within the second preset range based on the elements of the first kurtosis tensor;

The second preset range is indicated by [third preset threshold, fourth preset threshold]. The fourth preset threshold is greater than the third preset threshold.

At this step, for example, if one or more of the diffusion coefficients in each direction are within the second preset range, the one or more kurtosis coefficients in the directions corresponding to the one or more of the diffusion coefficients within the second preset range are determined based on the elements of the first kurtosis tensor using the formula (3).

S502, if one or more of the diffusion coefficients in each direction are outside the second preset range, determining that one or more kurtosis coefficients in directions corresponding to the one or more of the diffusion coefficients outside the second preset range are equal to a value within a third preset range;

The third preset range is indicated by [fifth preset threshold, sixth preset threshold]. The sixth preset threshold is greater than the fifth preset threshold.

In an embodiment, if one or more of the diffusion coefficients in each direction are outside the second preset range, the one or more kurtosis coefficients in the directions corresponding to the one or more of the diffusion coefficients outside the second preset range is determined to be equal to the value within the third preset range, which can be achieved as follows:

If one or more of the diffusion coefficients in each direction are smaller than the third preset threshold, then it can be determined that the one or more kurtosis coefficients in the directions corresponding to the one or more of the diffusion coefficients smaller than the third preset threshold are equal to any value within the third preset range, and if one or more of the diffusion coefficients in each direction are greater than the fourth preset threshold, then it can be determined that the one or more kurtosis coefficients in the directions corresponding to the one or more of the diffusion coefficients greater than the fourth preset threshold are equal to any value within the third preset range.

For example, if one or more of the diffusion coefficients in each direction are smaller than the third preset threshold, then it can be determined that the one or more kurtosis coefficients in the directions corresponding to the one or more of the diffusion coefficients smaller than the third preset threshold are equal to the fifth preset threshold. If one or more of the diffusion coefficients in each direction are greater than the fourth preset threshold, then it can be determined that the one or more kurtosis coefficients in the directions corresponding to the one or more of the diffusion coefficients greater than the fourth preset threshold are equal to the sixth preset threshold.

S503, correcting the first kurtosis tensor based on the kurtosis coefficients in each direction to obtain the elements of the second kurtosis tensor.

The first kurtosis tensor is corrected based on the kurtosis coefficients in each direction to obtain the elements of the second diffusion tensor using the formula (3). That is, a new kurtosis tensor is recalculated using the formula (3), and the newly obtained kurtosis tensor is used as the second kurtosis tensor.

The kurtosis coefficients in each direction at this step include the kurtosis coefficients in the directions corresponding to the diffusion coefficients within the second preset range determined in S501, and the kurtosis coefficients equal to the values within the third preset range as determined in S502.

In this embodiment, if one or more of the diffusion coefficients in each direction are within the second preset range, the one or more kurtosis coefficients in the directions corresponding to the one or more of the diffusion coefficients within the second preset range are determined based on the elements of the first kurtosis tensor, and if one or more of the diffusion coefficients in each direction are outside the second preset range, the one or more kurtosis coefficients in the directions corresponding to the one or more of the diffusion coefficients outside the second preset range are determined to be equal to a value within the third preset range. Further, the first kurtosis tensor is corrected based on the kurtosis coefficients in each direction to obtain elements of the second kurtosis tensor, thereby ensuring the accuracy of the obtained elements of the second kurtosis tensor.

Optionally, after the step S501 that if one or more of the diffusion coefficients in each direction are within a second preset range, determining one or more kurtosis coefficients in directions corresponding to the one or more of the diffusion coefficients within the second preset range based on the elements of the first kurtosis tensor, the method further includes the following step:

if any of the determined kurtosis coefficients in the directions corresponding to the diffusion coefficients within the second preset range is outside the third preset range, correcting the determined kurtosis coefficient outside the third preset range to a value within the third preset range.

In this embodiment, if any of the determined kurtosis coefficients in the directions corresponding to the diffusion coefficients within the second preset range is outside the third preset range, the determined kurtosis coefficient outside the third preset range is corrected to the value within the third preset range, so as to further ensure that the kurtosis coefficients in each direction are within the third preset range, i.e., to ensure that the kurtosis coefficients in each direction in the step S503 are all within the third preset range, thereby improving the accuracy of the elements of the second kurtosis tensor obtained by correcting the first kurtosis tensor based on the kurtosis coefficients in each direction.

Figure 6:
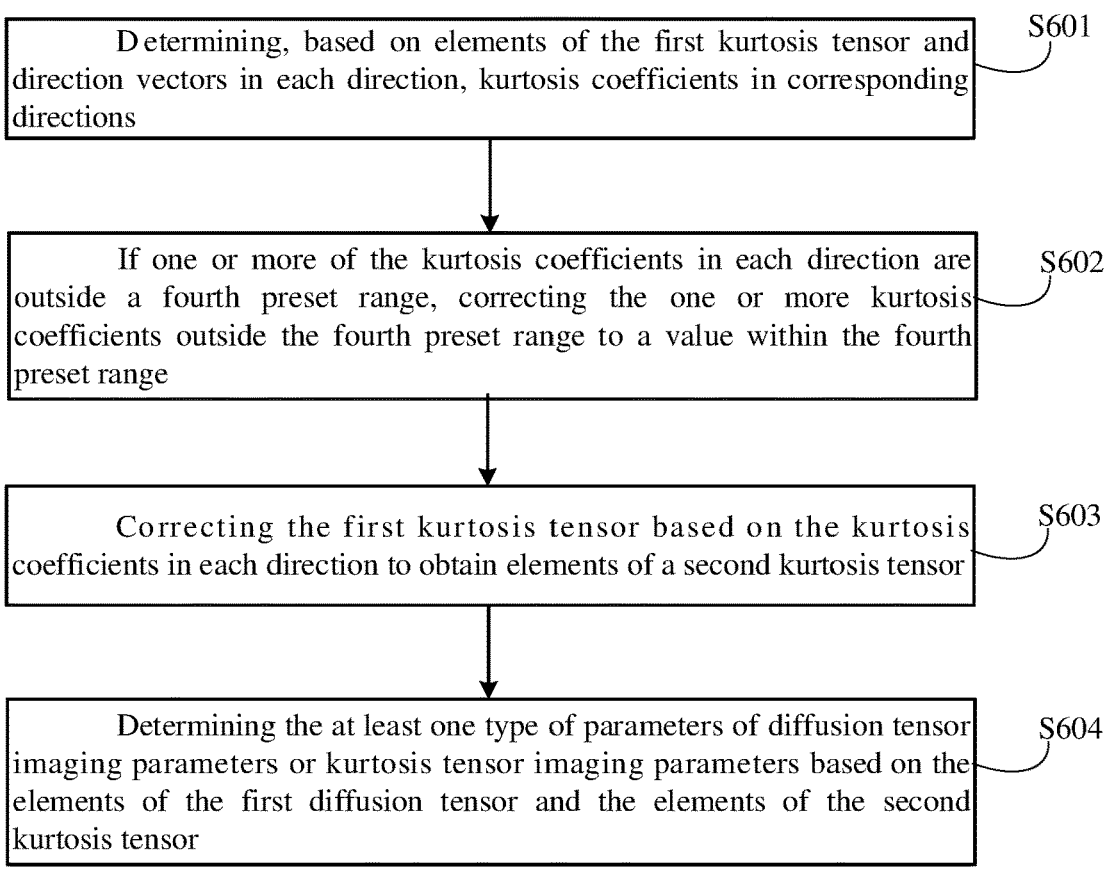
FIG. 6 is a third schematic flow chart of a method for determining imaging parameters according to an embodiment of the present disclosure.

Referring to FIG. 6, which is a third schematic flow diagram of the method for determining imaging parameters according to an embodiment of the present disclosure, this embodiment relates to an optional implementation regarding how to determine at least one type of parameters of diffusion tensor imaging parameters or kurtosis tensor imaging parameters based on the elements of the first diffusion tensor and the elements of the first kurtosis tensor. According to this embodiment, the step S103 includes the following steps:

S601, determining, based on elements of the first kurtosis tensor and direction vectors in each direction, kurtosis coefficients in corresponding directions;

S602, if one or more of the kurtosis coefficients in each direction are outside a fourth preset range, correcting the one or more of the kurtosis coefficients outside the fourth preset range to a value within the fourth preset range;

The fourth preset range is indicated by [seventh preset threshold, eighth preset threshold]. The eighth preset threshold is greater than the seventh preset threshold.

At this step, if one or more of the kurtosis coefficients in each direction are outside the fourth preset range, the one or more of the kurtosis coefficients outside the fourth preset range are corrected to a value within the fourth preset range, which can be achieved as follows:

If one or more of the kurtosis coefficients in each direction are smaller than the seventh preset threshold, the one or more of the kurtosis coefficients smaller than the seventh preset threshold can be corrected to any value within the fourth preset range. Alternatively, if one or more of the kurtosis coefficients in each direction are greater than the eighth preset threshold, the one or more of the kurtosis coefficients greater than the eighth preset threshold can be corrected to any value within the fourth preset range.

For example, if one or more of the kurtosis coefficients in each direction are smaller than the seventh preset threshold, the one or more of the kurtosis coefficients smaller than the seventh preset threshold can be corrected to be equal to the seventh preset threshold. If one or more of the kurtosis coefficients in each direction are greater than the eighth preset threshold, the one or more of the kurtosis coefficients greater than the eighth preset threshold can be corrected to be equal to the eighth preset threshold.

S603, correcting the first kurtosis tensor based on the kurtosis coefficients in each direction to obtain elements of a second kurtosis tensor; and S604, determining the at least one type of parameters of diffusion tensor imaging parameters or kurtosis tensor imaging parameters based on the elements of the first diffusion tensor and the elements of the second kurtosis tensor.

In this embodiment, the kurtosis coefficients in the corresponding directions are determined based on the elements of the first kurtosis tensor and the direction vectors in each direction, and if one or more of the kurtosis coefficients in each direction are outside the fourth preset range, the one or more of the kurtosis coefficients outside the fourth preset range are corrected to the value within the fourth preset range, so as to obtain the elements of the second kurtosis tensor by correcting the first kurtosis tensor. Further, the at least one type of parameters of diffusion tensor imaging parameters or kurtosis tensor imaging parameters are determined based on the elements of the first diffusion tensor and the elements of the second kurtosis tensor, and the accuracy of the determined at least one type of parameters of diffusion tensor imaging parameters or kurtosis tensor imaging parameters is improved.

Figure 7:
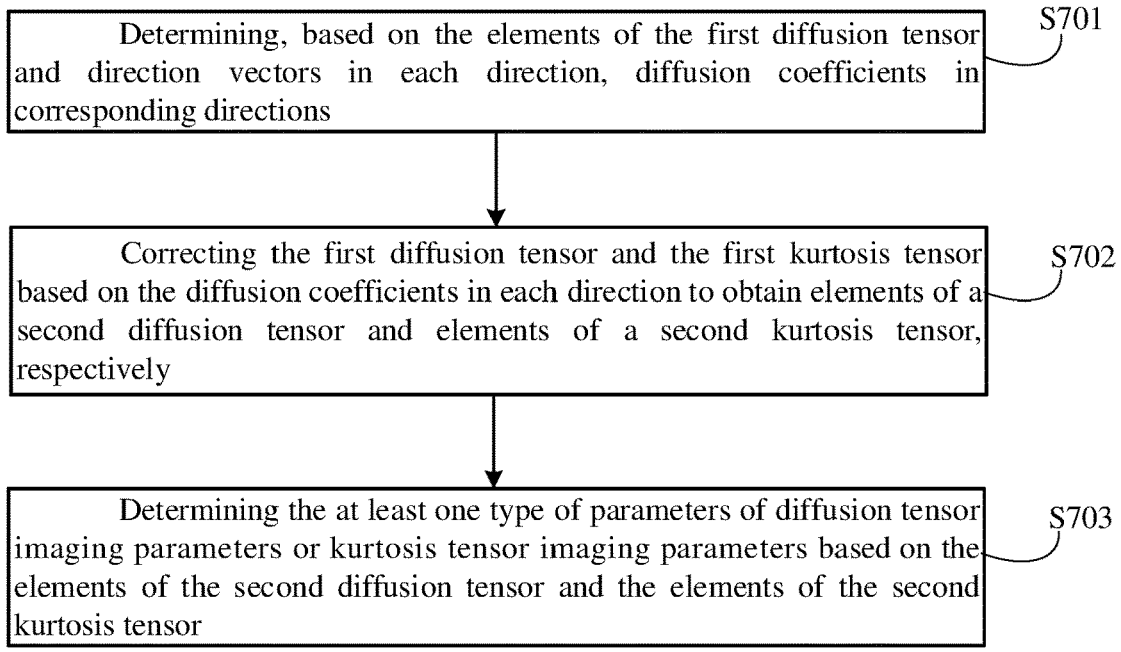
FIG. 7 is a fourth schematic flow chart of a method for determining imaging parameters according to an embodiment of the present disclosure.

Referring to FIG. 7, which is a fourth schematic flow chart of the method for determining imaging parameters according to an embodiment of the present disclosure, this embodiment relates to a way of simultaneously correcting a first diffusion tensor and a first kurtosis tensor to determine at least one type of parameters of diffusion tensor imaging parameters or kurtosis tensor imaging parameters. This embodiment relates particularly to an optional implementation regarding how to determine at least one type of parameters of diffusion tensor imaging parameters or kurtosis tensor imaging parameters based on the elements of the first diffusion tensor and the elements of the first kurtosis tensor. According to this embodiment, the step S103 includes the following steps:

S701, determining, based on the elements of the first diffusion tensor and direction vectors in each direction, diffusion coefficients in corresponding directions;

S702, correcting the first diffusion tensor and the first kurtosis tensor based on the diffusion coefficients in each direction to obtain elements of a second diffusion tensor and elements of a second kurtosis tensor, respectively; and S703, determining the at least one type of parameters of diffusion tensor imaging parameters or kurtosis tensor imaging parameters based on the elements of the second diffusion tensor and the elements of the second kurtosis tensor.

In this embodiment, the diffusion coefficients in the corresponding directions are determined based on the elements of the first diffusion tensor and the direction vectors in each direction. The elements of the second diffusion tensor and the elements of the second kurtosis tensor are obtained by correcting the first diffusion tensor and the first kurtosis tensor, respectively, based on the diffusion coefficients in each direction. Further, the at least one type of parameters of diffusion tensor imaging parameters or kurtosis tensor imaging parameters are determined based on the elements of the second diffusion tensor and the elements of the second kurtosis tensor. The accuracy of the determined at least one type of parameters of diffusion tensor imaging parameters or kurtosis tensor imaging parameters can be thus further improved by simultaneously correcting the first diffusion tensor and the first kurtosis tensor, respectively, in this embodiment.

Figure 8:
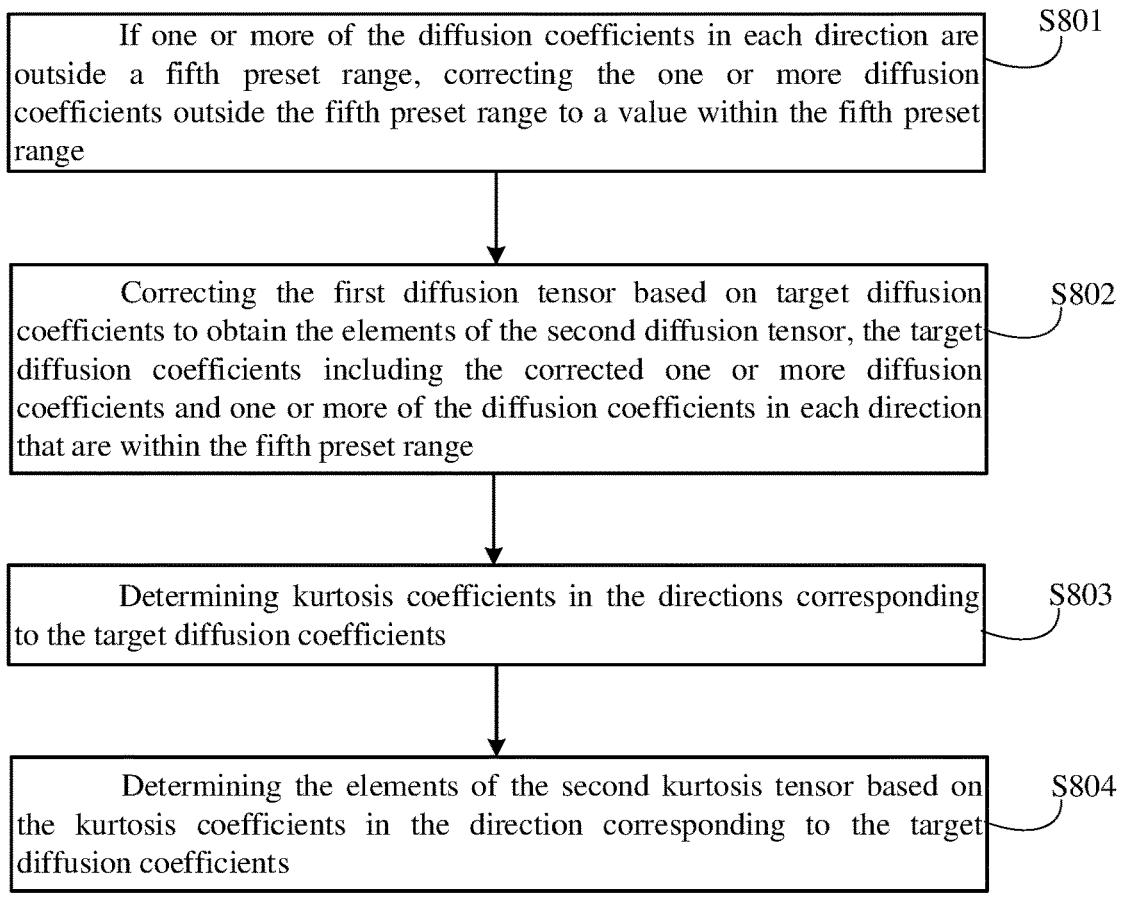
FIG. 8 is a schematic flow chart of a method for obtaining elements of a second diffusion tensor and elements of a second kurtosis tensor according to an embodiment of the present disclosure.

Referring to FIG. 8, which is a schematic flow chart of the method for obtaining the elements of the second diffusion tensor and the elements of the second kurtosis tensor according to an embodiment of the present disclosure, this embodiment relates to an optional implementation regarding how to obtain the elements of the second diffusion tensor and the elements of the second kurtosis tensor by correcting the first diffusion tensor and the first kurtosis tensor, respectively, based on the diffusion coefficients in each direction. According to this embodiment, the step S702 includes the following steps:

S801, if one or more of the diffusion coefficients in each direction are outside a fifth preset range, correcting the one or more of the diffusion coefficients outside the fifth preset range to a value within the fifth preset range;

The fifth preset range is indicated by [ninth preset threshold, tenth preset threshold]. The tenth preset threshold is greater than the ninth preset threshold.

In an embodiment, if one or more of the diffusion coefficients in each direction are smaller than the ninth preset threshold, the one or more of the diffusion coefficients smaller than the ninth preset threshold are corrected to any value within the fifth preset range. If one or more of the diffusion coefficients in each direction are greater than the tenth preset threshold, the one or more of the diffusion coefficients greater than the tenth preset threshold are corrected to any value within the fifth preset range.

For example, if one or more of the diffusion coefficients in each direction are smaller than the ninth preset threshold, the one or more of the diffusion coefficients smaller than the ninth preset threshold are corrected to be equal to the ninth preset threshold, and if one or more of the diffusion coefficients in each direction are greater than the tenth preset threshold, the one or more of the diffusion coefficients greater than the tenth preset threshold are corrected to be equal to the tenth preset threshold.

S802, correcting the first diffusion tensor based on target diffusion coefficients to obtain the elements of the second diffusion tensor, the target diffusion coefficients including the corrected one or more of diffusion coefficients and one or more of the diffusion coefficients in each direction that are within the fifth preset range;

The first diffusion tensor is corrected based on the target diffusion coefficients to obtain the elements of the second diffusion tensor using the formula (2), that is, a new diffusion tensor is recalculated using formula (2), and the newly obtained diffusion tensor is used as the second diffusion tensor.

S803, determining kurtosis coefficients in the directions corresponding to the target diffusion coefficients; and S804, determining the elements of the second kurtosis tensor based on the kurtosis coefficients in the directions corresponding to the target diffusion coefficients.

The first kurtosis tensor is corrected based on the kurtosis coefficients in the directions corresponding to the target diffusion coefficients using the formula (3) to obtain the elements of the second diffusion tensor, that is, a new kurtosis tensor is recalculated using formula (3), and the newly obtained kurtosis tensor is used as the second kurtosis tensor.

In this embodiment, the elements of the second diffusion tensor are obtained by correcting the first diffusion tensor, and the kurtosis coefficients in the directions corresponding to the target diffusion coefficients are determined. Further, the elements of the second kurtosis tensor are determined based on the kurtosis coefficients in the directions corresponding to the target diffusion coefficient. The accuracy of the obtained elements of the second diffusion tensor and the obtained elements of the second kurtosis tensor is thus ensured.

Figure 9:
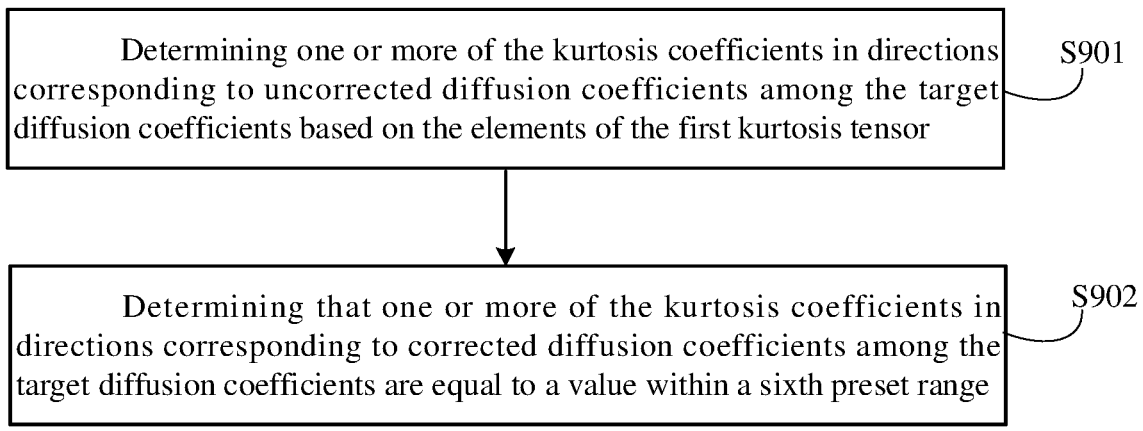
FIG. 9 is a schematic flow chart of a method for determining kurtosis coefficients according to an embodiment of the present disclosure.

Referring to FIG. 9, which is a schematic flow chart of the method for determining the kurtosis coefficients according to an embodiment of the present disclosure, this embodiment relates to an optional implementation regarding how to determine the kurtosis coefficients in the directions corresponding to the target diffusion coefficients. According to this embodiment, the step S803 includes the following steps:

S901, determining one or more of the kurtosis coefficients in directions corresponding to uncorrected diffusion coefficients among the target diffusion coefficients based on the elements of the first kurtosis tensor;

At this step, the kurtosis coefficients in the directions corresponding to the uncorrected diffusion coefficients among the target diffusion coefficients are determined based on the elements of the first kurtosis tensor using the formula (3).

S902, determining that one or more of the kurtosis coefficients in directions corresponding to corrected diffusion coefficients among the target diffusion coefficients are equal to a value within a sixth preset range.

The sixth preset range is indicated by [eleventh preset threshold, twelfth preset threshold]. The twelfth preset threshold is greater than the eleventh preset threshold.

At this step, the kurtosis coefficients in the directions corresponding to the corrected diffusion coefficients among the target diffusion coefficients are determined to be equal to a value within the sixth preset range, which can be achieved as follows:

If the diffusion coefficient is smaller than the ninth preset threshold, the kurtosis coefficient in the direction corresponding to the diffusion coefficient smaller than the ninth preset threshold can be determined to be equal to any value within the sixth preset range, and if the diffusion coefficient is greater than the tenth preset threshold, the kurtosis coefficient in the direction corresponding to the diffusion coefficient greater than the tenth preset threshold can be determined to be equal to any value within the sixth preset range.

For example, if the diffusion coefficient is smaller than the ninth preset threshold, it can be determined that the kurtosis coefficient in the direction corresponding to the diffusion coefficient smaller than the ninth preset threshold are equal to the eleventh preset threshold. If the diffusion coefficient is greater than the tenth preset threshold, it can be determined that the kurtosis coefficient in the direction corresponding to the diffusion coefficient greater than the tenth preset threshold is equal to the twelfth preset threshold.

In this embodiment, the accuracy of the final obtained kurtosis coefficients is improved by determining the kurtosis coefficients in the directions corresponding to the uncorrected diffusion coefficients among the target diffusion coefficients based on the elements of the first kurtosis tensor, and by determining that the kurtosis coefficients in the directions corresponding to the corrected diffusion coefficients among the target diffusion coefficients are equal to the value within the sixth preset range. Further, the accuracy of the kurtosis tensor obtained based on the final kurtosis coefficients is improved.

Optionally, after the step S901 of determining the one or more of the kurtosis coefficients in the directions corresponding to the uncorrected diffusion coefficients among the target diffusion coefficients based on the elements of the first kurtosis tensor, the method further includes the following step:

If any of the determined kurtosis coefficients in the directions corresponding to the uncorrected diffusion coefficients among the target diffusion coefficients is outside the sixth preset range, correcting the kurtosis coefficient outside the sixth preset range to a value within the sixth preset range.

In this embodiment, if any of the determined kurtosis coefficients in the directions corresponding to the uncorrected diffusion coefficients among the target diffusion coefficients is outside the sixth preset range, the kurtosis coefficient outside the sixth preset range is corrected to a value within the sixth preset range. Thus, the calculated kurtosis coefficients are corrected, ensuring that the final kurtosis coefficients are all values within the sixth preset range, and thus ensuring the accuracy of the second kurtosis tensor obtained based on the final kurtosis coefficients and the accuracy of the kurtosis tensor imaging parameters determined based on the second kurtosis tensor.

Figure 10:
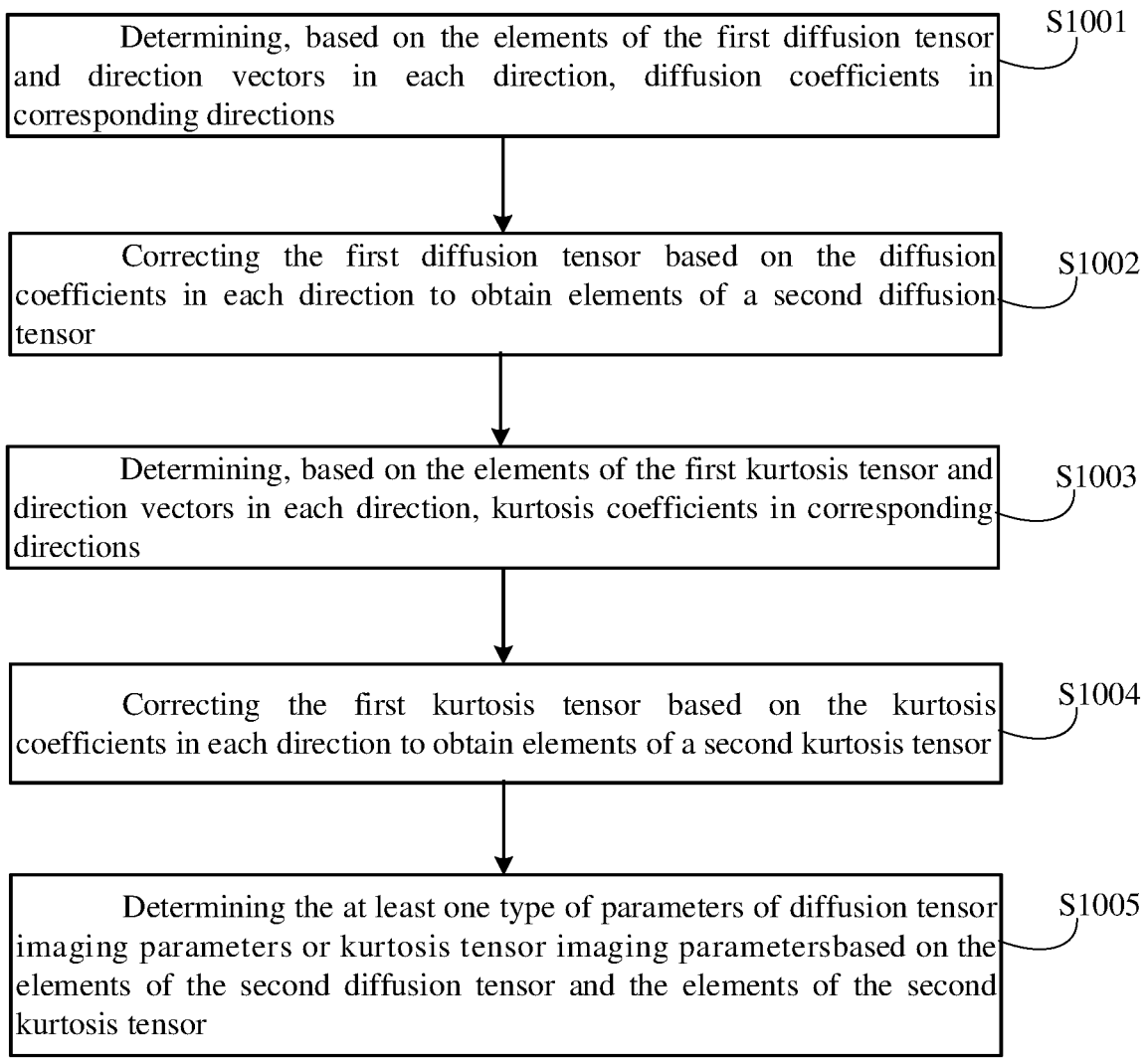
FIG. 10 is a fifth schematic flow chart of a method for determining imaging parameters according to an embodiment of the present disclosure.

Referring to FIG. 10, which is a fifth schematic flow chart of the method for determining imaging parameters according to an embodiment of the present disclosure, this embodiment relates to an optional implementation regarding how to determine at least one type of parameters of diffusion tensor imaging parameters or kurtosis tensor imaging parameters based on the elements of the first diffusion tensor and the elements of the first kurtosis tensor. According to this embodiment, the step S103 includes the following steps:

S1001, determining, based on the elements of the first diffusion tensor and direction vectors in each direction, diffusion coefficients in corresponding directions;

The diffusion coefficients in the corresponding directions are determined based on the elements of the first diffusion tensor and the direction vectors in each direction. For example, the diffusion coefficients in the corresponding directions can be determined by forward calculation of the formula (2).

S1002, correcting the first diffusion tensor based on the diffusion coefficients in each direction to obtain elements of a second diffusion tensor;

The first diffusion tensor is corrected based on the diffusion coefficients in each direction to obtain the elements of the second diffusion tensor. For example, the elements of the second diffusion tensor can be obtained by reverse calculation of the formula (2).

The first diffusion tensor is corrected based on the diffusion coefficients in each direction to obtain the elements of the second diffusion tensor, which can be achieved by the method provided in the above-mentioned embodiments and will not be repeated here.

S1003, determining, based on the elements of the first kurtosis tensor and direction vectors in each direction, kurtosis coefficients in corresponding directions;

The kurtosis coefficients in the corresponding directions are determined based on the elements of the first kurtosis tensor and the direction vectors in each direction, for example, by forward calculation of the formula (3) to determine the kurtosis coefficients in the corresponding directions.

S1004, correcting the first kurtosis tensor based on the kurtosis coefficients in each direction to obtain elements of a second kurtosis tensor;

The first kurtosis tensor is corrected based on the kurtosis coefficients in each direction to obtain the elements of the second kurtosis tensor. For example, the elements of the second kurtosis tensor can be obtained by reverse calculation of the formula (3).

S1005, determining the at least one type of parameters of diffusion tensor imaging parameters or kurtosis tensor imaging parameters based on the elements of the second diffusion tensor and the elements of the second kurtosis tensor.

In this embodiment, the elements of the second diffusion tensor are obtained by correcting the first diffusion tensor based on the diffusion coefficients in each direction, and the elements of the second kurtosis tensor are obtained by correcting the first kurtosis tensor based on the kurtosis coefficients in each direction. Further, the at least one type of parameters of diffusion tensor imaging parameters or kurtosis tensor imaging parameters are determined based on the elements of the second diffusion tensor and the elements of the second kurtosis tensor. The accuracy of the determined at least one type of parameters of diffusion tensor imaging parameters or kurtosis tensor imaging parameters is thereby ensured.

Optionally, the step S102 of fitting the scan image signals using an unconstrained optimization algorithm to obtain elements of the first diffusion tensor and elements of the first kurtosis tensor can be achieved by:

solving a multi-directional diffusion kurtosis imaging model based on the scan image signals using the unconstrained optimization algorithm to obtain the elements of the first diffusion tensor and the elements of the first kurtosis tensor.

The multi-directional diffusion kurtosis imaging model at this step is, for example, the model represented by the formula (1). At least 21 equations based on formula (1) are established based on the scan image signals, and the at least 21 equations are solved jointly to obtain the elements of the first diffusion tensor and the elements of the first kurtosis tensor.

It should be understood that although the steps in the flow charts involved in the embodiments described above are shown sequentially as indicated by the arrows, these steps are not necessarily performed sequentially in the order indicated by the arrows. Unless as expressly stated herein, there is no strict order in which these steps are performed, and they may be performed in other orders. Moreover, at least some of the steps in the flow charts involved in the above embodiments may include multiple steps or multiple stages that are not necessarily performed at the same time, but may be performed at different times. Further, these steps or stages are not necessarily performed in sequence, but may be performed with other steps together, or at least some of steps or stages of the other steps in turn or alternately.

Based on the same inventive concept, embodiments of the present disclosure also provide a diffusion kurtosis imaging device for implementing the above-described diffusion kurtosis imaging method. The solution provided by the device is similar to that in the method described above, so the specific description of one or more embodiments of the diffusion kurtosis imaging device provided below can be found in the above description for the diffusion kurtosis imaging method, and will not be repeated herein.

Figure 11:
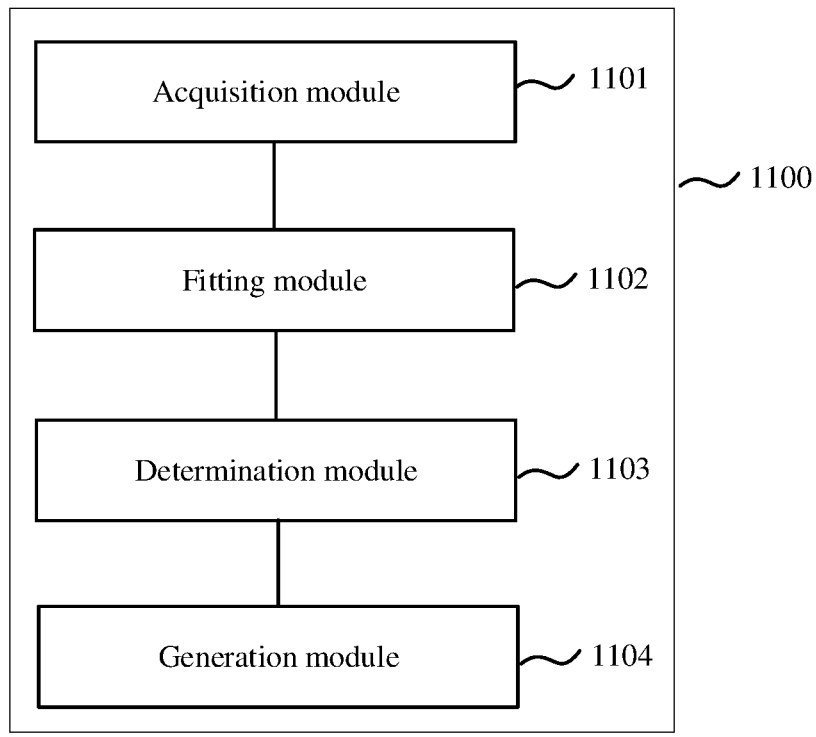
FIG. 11 is a schematic view illustrating a structure of a diffuse kurtosis imaging device according to an embodiment of the present disclosure.

In an embodiment, as shown in FIG. 11, which is a schematic view illustrating a structure of a diffusion kurtosis imaging device according to an embodiment of the present disclosure, the device 1100 includes following modules:

an acquisition module 1101 for acquiring scan image signals of a scanned object;

a fitting module 1102 for fitting the scan image signals using an unconstrained optimization algorithm to obtain elements of a first diffusion tensor and elements of a first kurtosis tensor;

a determination module 1103 for determining at least one type of parameters of diffusion tensor imaging parameters or kurtosis tensor imaging parameters based on the elements of the first diffusion tensor and the elements of the first kurtosis tensor; and a generation module 1104 for generating a parametric image based on the at least one type of parameters of diffusion tensor imaging parameters or kurtosis tensor imaging parameters.

According to the diffusion kurtosis imaging device of this embodiment, the elements of the first diffusion tensor and the elements of the first kurtosis tensor are obtained by acquiring the scan image signals of the scanned object and fitting the scan image signals using an unconstrained optimization algorithm. The at least one type of parameters of diffusion tensor imaging parameters or kurtosis tensor imaging parameters are determined based on the elements of the first diffusion tensor and the elements of the first kurtosis tensor. The parameter image is generated based on the at least one type of parameters of diffusion tensor imaging parameters or kurtosis tensor imaging parameters. Since the unconstrained optimization algorithm requires a short calculation time and has a higher computation efficiency, it takes a relatively short time to obtain the elements of the first diffusion tensor and the elements of the first kurtosis tensor based on the unconstrained optimization algorithm in this embodiment, thereby improving the efficiency of the generation of the parameter image and reducing the computation time for the generation of the parameter image.

In an embodiment, the determination module 1103 includes:
- a first determination unit for determining, based on the elements of the first diffusion tensor and direction vectors in each direction, diffusion coefficients in corresponding directions;
- a first correction unit for correcting the first diffusion tensor based on the diffusion coefficients in each the direction to obtain elements of a second diffusion tensor; and
- a second determination unit for determining the at least one type of parameters of diffusion tensor imaging parameters or kurtosis tensor imaging parameters based on the elements of the second diffusion tensor and the elements of the first kurtosis tensor;

In an embodiment, the first correction unit is specifically configured for, if one or more of the diffusion coefficients in each direction are outside a first preset range, correcting the one or more of the diffusion coefficients outside the first preset range to a value within the first preset range, the first preset range being indicated by [first preset threshold, second preset threshold]; and correcting the first diffusion tensor based on the corrected one or more of the diffusion coefficients and one or more remaining diffusion coefficients to obtain the elements of the second diffusion tensor. The one or more remaining diffusion coefficients include diffusion coefficients in each direction that are within the first preset range.

In an embodiment, the determination module 1103 includes:
- a third determination unit for determining, based on the elements of the first diffusion tensor and direction vectors in each direction, diffusion coefficients in corresponding directions;
- a third correction unit for correcting the first diffusion tensor based on the diffusion coefficients in each direction to obtain elements of a second diffusion tensor;
- a fourth determination unit for determining the at least one type of parameters of diffusion tensor imaging parameters or kurtosis tensor imaging parameters based on the elements of the second diffusion tensor and the elements of the first kurtosis tensor.

In an embodiment, the third correction unit is specifically configured for, if one or more of the diffusion coefficients in each direction are within a second preset range, determining one or more kurtosis coefficients in the directions corresponding to the one or more of the diffusion coefficients within the second preset range based on the elements of the first kurtosis tensor. The second preset range is indicated by [third preset threshold, fourth preset threshold];
- if one or more of the diffusion coefficients in each direction are outside the second preset range, determining that one or more kurtosis coefficients in the directions corresponding to the one or more of the diffusion coefficients outside the second preset range are equal to a value within a third preset range indicated by [fifth preset threshold, sixth preset threshold]; and
- correcting the first kurtosis tensor based on the kurtosis coefficients in each direction to obtain elements of the second kurtosis tensor.

In an embodiment, the third correction unit is further configured for, if any of the determined kurtosis coefficients in the directions corresponding to the diffusion coefficients within the second preset range is outside the third preset range, correcting the determined kurtosis coefficient outside third preset range to a value within the third preset range.

In an embodiment, the determination module 1103 includes:
- a fifth determination unit for determining, based on the elements of the first kurtosis tensor and direction vectors in each direction, kurtosis coefficients in corresponding directions;
- a fifth correction unit configured for, if one or more of the kurtosis coefficients in each direction are outside a fourth preset range, correcting the one or more of the kurtosis coefficients outside the fourth preset range to a value within the fourth preset range, the fourth preset range being indicated by [seventh preset threshold, eighth preset threshold];
- a sixth correction unit for correcting the first kurtosis tensor based on the kurtosis coefficients in each direction to obtain elements of the second kurtosis tensor; and
- a sixth determination unit for determining at least one type of parameters of diffusion tensor imaging parameters or kurtosis tensor imaging parameters based on the elements of the first diffusion tensor and the elements of the second kurtosis tensor.

In an embodiment, the determination module 1103 includes:
- a seventh determination unit for determining, based on the elements of the first diffusion tensor and direction vectors in each direction, diffusion coefficients in corresponding directions;
- a seventh correction unit for correcting the first diffusion tensor and the first kurtosis tensor based on the diffusion coefficients in each direction to obtain elements of a second diffusion tensor and elements of a second kurtosis tensor, respectively; and
- an eighth determination unit for determining the diffusion tensor imaging parameters and the kurtosis tensor imaging parameters based on the elements of the second diffusion tensor and the elements of the second kurtosis tensor.

In an embodiment, the seventh correction unit includes:
- a first correction subunit configured for, if one or more of the diffusion coefficients in each direction are outside a fifth preset range, correcting the one or more of the diffusion coefficients outside the fifth preset range to a value within the fifth preset range, the fifth preset range being indicated by [ninth preset threshold, tenth preset threshold];
- a second correction subunit for correcting the first diffusion tensor based on target diffusion coefficients to obtain the elements of the second diffusion tensor, the target diffusion coefficients including the corrected one or more of diffusion coefficients and one or more of the diffusion coefficients in each direction that are within the fifth preset range;
- a first determination subunit for determining kurtosis coefficients in the directions corresponding to the target diffusion coefficients; and
- a second determination subunit for determining the elements of the second kurtosis tensor based on the kurtosis coefficients in the directions corresponding to the target diffusion coefficients.

In an embodiment, the first determination subunit is specifically configured for determining the kurtosis coefficients in the directions corresponding to the uncorrected diffusion coefficients among the target diffusion coefficients based on the elements of the first kurtosis tensor, and determining that the kurtosis coefficients in the directions corresponding to the corrected diffusion coefficients among the target diffusion coefficients are equal to a value within a sixth preset range indicated by [eleventh preset threshold, twelfth preset threshold].

In an embodiment, the first determining subunit is further configured for, if any of the determined kurtosis coefficients in the directions corresponding to the uncorrected diffusion coefficients among the target diffusion coefficients is outside the sixth preset range, correcting the determined kurtosis coefficient outside the sixth preset range to a value within the sixth preset range.

In an embodiment, the determination module 1103 includes:
- a ninth determination unit for determining, based on the elements of the first diffusion tensor and direction vectors in each direction, diffusion coefficients in corresponding directions;
- a ninth correction unit for correcting the first diffusion tensor based on the diffusion coefficients in each direction to obtain elements of a second diffusion tensor;
- a tenth determination unit for determining, based on the elements of the first kurtosis tensor and direction vectors in each direction, kurtosis coefficients in corresponding directions;
- a tenth correction unit for correcting the first kurtosis tensor based on the kurtosis coefficients in each the direction to obtain elements of the second kurtosis tensor; and
- an eleventh determination unit for determining at least one type of parameters of diffusion tensor imaging parameters or kurtosis tensor imaging parameters based on the elements of the second diffusion tensor and the elements of the second kurtosis tensor.

In an embodiment, the fitting module is specifically configured for solving a multi-directional diffusion kurtosis imaging model using an unconstrained optimization algorithm based on the scan image signals to obtain elements of the first diffusion tensor and elements of the first kurtosis tensor.

In an embodiment, the scan image signals include image signals with diffuse intensity in multiple directions.

The modules of the above diffusion kurtosis imaging device may be implemented in whole or in part by software, hardware and combinations thereof. Each of the modules may be implemented in the form of hardware embedded in or independent of a processor in a computer device, or may be, as a software, stored in a memory in the computer device so that a processor can call the software to perform the operations corresponding to each of the above modules.

Figure 12:
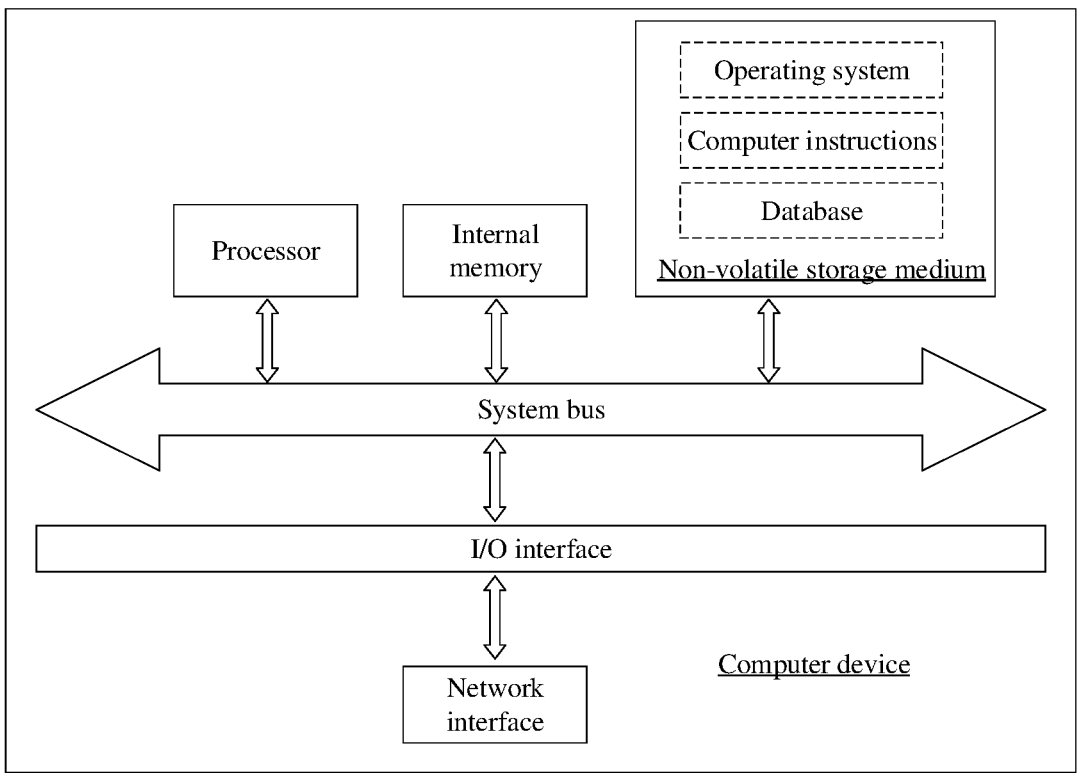
FIG. 12 is a schematic view illustrating an internal structure of a computer device according to an embodiment.

In an embodiment, a computer device is provided, which may be a server, and which has an internal structure as shown in FIG. 12. The computer device includes a processor, a memory, and a network interface which are connected via a system bus. The processor of the computer device is used to provide computing and control functions. The memory of the computer device includes a non-transitory storage medium and an internal memory. The non-transitory storage medium stores an operating system, computer instructions, and a database. The internal memory provides an environment for operation of the operating system and the computer instructions in the non-transitory storage medium. The database of the computer device is used to store scan image signals data. The network interface of the computer device is used to communicate with an external terminal via a network. The computer instructions are executed by the processor to implement a diffusion kurtosis imaging method.

It will be understood by those skilled in the art that the structure illustrated in FIG. 12, which is only a block diagram of a portion of the structure associated with the solutions provided by the present disclosure, does not constitute a limitation to the computer device on which the solutions of the present disclosure are applied, and the specific computer device may include more or fewer components than shown in the figure, or combine certain components, or have a different arrangement of components.

In an embodiment, a computer device is provided, which includes a memory and a processor. The computer instructions are stored in the memory. The processor, when executing the computer instructions, performs the following steps:
acquiring scan image signals of a scanned object; fitting the scan image signals using an unconstrained optimization algorithm to obtain elements of a first diffusion tensor and elements of a first kurtosis tensor; determining at least one type of parameters of diffusion tensor imaging parameters or kurtosis tensor imaging parameters based on the elements of the first diffusion tensor and the elements of the first kurtosis tensor; and generating a parameter image based on the at least one type of parameters of diffusion tensor imaging parameters or kurtosis tensor imaging parameters.

In an embodiment, the processor when executing the computer instructions further performs the following steps:
determining, based on the elements of the first diffusion tensor and direction vectors in each direction, diffusion coefficients in corresponding directions; correcting the first diffusion tensor based on the diffusion coefficients in each direction to obtain elements of a second diffusion tensor; and determining the at least one type of parameters of diffusion tensor imaging parameters or kurtosis tensor imaging parameters based on the elements of the second diffusion tensor and the elements of the first kurtosis tensor.

In an embodiment, the processor when executing the computer instructions further performs the following steps:
if one or more of the diffusion coefficients in each direction are outside a first preset range, correcting the one or more of the diffusion coefficients outside the first preset range to a value within the first preset range, the first preset range being indicated by [first preset threshold, second preset threshold]; and correcting the first diffusion tensor based on the corrected one or more of the diffusion coefficients and one or more remaining diffusion coefficients to obtain the elements of the second diffusion tensor. The one or more remaining diffusion coefficients include diffusion coefficients in each direction that are within the first preset range.

In an embodiment, the processor when executing the computer instructions further performs the following steps:
determining, based on the elements of the first diffusion tensor and direction vectors in each direction, diffusion coefficients in corresponding directions; correcting the first diffusion tensor and the first kurtosis tensor based on the diffusion coefficients in each direction to obtain elements of a second diffusion tensor and elements of a second kurtosis tensor, respectively; and determining the diffusion tensor imaging parameters and the kurtosis tensor imaging parameters based on the elements of the second diffusion tensor and the elements of the second kurtosis tensor.

In an embodiment, the processor, when executing the computer instructions, further performs the following steps:
if one or more of the diffusion coefficients in each direction are within a second preset range, determining one or more kurtosis coefficients in directions corresponding to the one or more of the diffusion coefficients within the second preset range based on the elements of the first kurtosis tensor, the second preset range being indicated by [third preset threshold, fourth preset threshold]; if one or more of the diffusion coefficients in each direction are outside the second preset range, determining that one or more kurtosis coefficients in directions corresponding to the one or more of the diffusion coefficients outside the second preset range are equal to a value within a third preset range, the third preset range being indicated by [fifth preset threshold, sixth preset threshold]; and correcting the first kurtosis tensor based on the kurtosis coefficients in each direction to obtain elements of the second kurtosis tensor.

In an embodiment, the processor when executing the computer instructions further performs the following steps:
determining, based on the elements of the first kurtosis tensor and direction vectors in each direction, kurtosis coefficients in corresponding directions; if one or more of the kurtosis coefficients in each direction are outside a fourth preset range, correcting the one or more of the kurtosis coefficients outside the fourth preset range to a value within the fourth preset range, the fourth preset range being indicated by [seventh preset threshold, eighth preset threshold]; correcting the first kurtosis tensor based on the kurtosis coefficients in each direction to obtain elements of a second kurtosis tensor; and determining the at least one type of parameters of diffusion tensor imaging parameters or kurtosis tensor imaging parameters based on the elements of the first diffusion tensor and the elements of the second kurtosis tensor.

In an embodiment, the processor when executing the computer instructions further performs the following steps:
determining, based on the elements of the first diffusion tensor and direction vectors in each direction, diffusion coefficients in corresponding directions; correcting the first diffusion tensor and the first kurtosis tensor based on the diffusion coefficients in each direction to obtain elements of a second diffusion tensor and elements of a second kurtosis tensor, respectively; and determining the diffusion tensor imaging parameters and the kurtosis tensor imaging parameters based on the elements of the second diffusion tensor and the elements of the second kurtosis tensor.

In an embodiment, the processor when executing the computer instructions further performs the following steps:
if one or more of the diffusion coefficients in each direction are outside a fifth preset range, correcting the one or more of the diffusion coefficients outside the fifth preset range to a value within the fifth preset range, the fifth preset range being indicated by [ninth preset threshold, tenth preset threshold]; correcting the first diffusion tensor based on target diffusion coefficients to obtain the elements of the second diffusion tensor, the target diffusion coefficients including the corrected one or more of diffusion coefficients and one or more of the diffusion coefficients in each direction that are within the fifth preset range; determining kurtosis coefficients in the directions corresponding to the target diffusion coefficients based on the target diffusion coefficients; and determining the elements of the second kurtosis tensor based on the kurtosis coefficients in the directions corresponding to the target diffusion coefficients.

In an embodiment, the processor when executing the computer instructions further performs the following steps:
determining one or more of the kurtosis coefficients in directions corresponding to uncorrected diffusions coefficients among the target diffusions coefficients based on the elements of the first kurtosis tensor; and determining that one or more of the kurtosis coefficients in the directions corresponding to corrected diffusion coefficients among the target diffusion coefficients are equal to a value within a sixth preset range, the sixth preset range being indicated by [eleventh preset threshold, twelfth preset threshold].

In an embodiment, the processor when executing the computer instructions further performs the following step:
if any of the determined kurtosis coefficients in the directions corresponding to the uncorrected diffusion coefficients among the target diffusion coefficients is outside the sixth preset range, correcting the determined kurtosis coefficient outside the sixth preset range to a value within the sixth preset range.

In an embodiment, the processor when executing the computer instructions further performs the following steps:
determining, based on the elements of the first diffusion tensor and direction vectors in each direction, diffusion coefficients in corresponding directions; correcting the first diffusion tensor based on the diffusion coefficients in each direction to obtain elements of a second diffusion tensor; determining, based on the elements of the first kurtosis tensor and direction vectors in each direction, kurtosis coefficients in corresponding directions; correcting the first kurtosis tensor based on the kurtosis coefficients in each the direction to obtain elements of a second kurtosis tensor; and determining at least one type of parameters of diffusion tensor imaging parameters or kurtosis tensor imaging parameters based on the elements of the second diffusion tensor and the elements of the second kurtosis tensor.

In an embodiment, the processor executing the computer instructions further performs the following step:
solving a multi-directional diffusion kurtosis imaging model using the unconstrained optimization algorithm based on the scan image signals to obtain the elements of the first diffusion tensor and the elements of the first kurtosis tensor.

In an embodiment, the scan image signals include image signals with diffuse intensity in multiple directions.

In an embodiment, a computer readable storage medium having computer instructions stored thereon is provided, and the computer instructions when executed by a processor cause the processor to perform the steps of the diffusion kurtosis imaging method according to above embodiments.

In an embodiment, a computer instructions product having computer instructions is provided. The computer instructions when executed by a processor cause the processor to perform the steps of the diffusion kurtosis imaging method according to the above embodiments.

It is noted that the user information (including, but not limited to, user device information, user personal information, etc.) and data (including, but not limited to, data for analysis, stored data, displayed data, etc.) involved in this disclosure are information and data authorized by the user or fully authorized by the parties.

A person of ordinary skill in the art can understand that all or part of the processes in the methods of the above embodiments can by achieving by computer instructions instructing the relevant hardware to do so. The computer instructions can be stored in a non-transitory computer readable storage medium, and when executed, perform the processes such as those of the methods of the embodiments described above. The memory, database, or other medium recited in the embodiments of the disclosure include at least one of non-transitory and transitory memory. Non-transitory memory includes read-only memory (ROM), magnetic tape, floppy disk, flash memory, optical memory, high density embedded non-transitory memory, resistive memory (ReRAM), magnetoresistive random access memory (MRAM), ferroelectric memory (FRAM), phase change memory (PCM), or graphene memory, etc. Transitory memory includes random access memory (RAM) or external cache memory, etc. For illustration rather than limitation, RAM may be in various forms, such as static random access memory (SRAM) or dynamic random access memory (DRAM), etc. The databases involved in the embodiments of the present disclosure may include at least one of a relational database and a non-relational database. The non-relational databases may include, without limitation, a blockchain-based distributed database, etc. The processors involved in the embodiments of the present application may be general purpose processors, central processing units, graphics processors, digital signal processors, programmable logicians, quantum computing based data processing logicians, etc., without limitation.

The technical features of the foregoing embodiments may be freely combined. For brevity, not all possible combinations of the technical features in the foregoing embodiments are described. However, the combinations of these technical features should be considered to be included within the scope of this disclosure, as long as the combinations are not contradictory.

The above described embodiments express only implementations of the present application, the descriptions of which are specific and detailed, but cannot be construed as a limitation of the scope of the present application. It is noted that for a person of ordinary skill in the art, variations and improvements can be made without departing from the concept of the present application, which all belong to the protection scope of the present application. Therefore, the protection scope of the present application shall be subject to the attached claims.

What is claimed is:

1. A diffusion kurtosis imaging method, comprising:
    acquiring scan image signals of a scanned object;
    fitting the scan image signals using an unconstrained optimization algorithm to obtain elements of a first diffusion tensor and elements of a first kurtosis tensor;
    determining at least one type of parameters of diffusion tensor imaging parameters or kurtosis tensor imaging parameters based on the elements of the first diffusion tensor and the elements of the first kurtosis tensor, wherein the diffusion tensor imaging parameters include at least one of diffusion coefficients in each direction, a mean diffusion coefficient, an axial diffusion coefficient, a radial diffusion coefficient, or a diffusion anisotropy coefficient, and the kurtosis tensor imaging parameters include at least one of kurtosis coefficients in each direction, a mean kurtosis coefficient, an axial kurtosis coefficient, a radial kurtosis coefficient, or a kurtosis anisotropy coefficient; and
    generating a parameter image based on the at least one type of parameters of diffusion tensor imaging parameters or kurtosis tensor imaging parameters,
    wherein determining the at least one type of parameters of the diffusion tensor imaging parameters or the kurtosis tensor imaging parameters based on the elements of the first diffusion tensor and the elements of the first kurtosis tensor comprising:
        calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor.

2. The method of claim 1, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
    determining, based on the elements of the first diffusion tensor and direction vectors in each direction, diffusion coefficients in corresponding directions;
    correcting the first diffusion tensor based on the diffusion coefficients in each direction to obtain elements of a second diffusion tensor; and
    determining the at least one type of parameters of diffusion tensor imaging parameters or kurtosis tensor imaging parameters based on the elements of the second diffusion tensor and the elements of the first kurtosis tensor.

3. The method of claim 2, wherein the correcting the first diffusion tensor based on the diffusion coefficients in each direction to obtain the elements of the second diffusion tensor includes:
    if one or more of the diffusion coefficients in each direction are outside a first preset range, correcting the one or more of the diffusion coefficients outside the first preset range to a value within the first preset range, wherein the first preset range is from a first preset threshold to a second preset threshold; and
    correcting the first diffusion tensor based on the corrected one or more of the diffusion coefficients and one or more remaining diffusion coefficients to obtain the elements of the second diffusion tensor, wherein the one or more remaining diffusion coefficients comprise one or more of the diffusion coefficients in each direction that are within the first preset range.

4. The method of claim 1, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
    determining, based on the elements of the first diffusion tensor and direction vectors in each direction, diffusion coefficients in corresponding directions;
    correcting the first kurtosis tensor based on the diffusion coefficients in each direction to obtain elements of a second kurtosis tensor; and determining the at least one type of parameters of diffusion tensor imaging parameters or kurtosis tensor imaging parameters based on the elements of the first diffusion tensor and the elements of the second kurtosis tensor.

5. The method of claim 4, wherein the correcting the first kurtosis tensor based on the diffusion coefficients in each direction to obtain the elements of the second kurtosis tensor includes:
if one or more of the diffusion coefficients in each direction are within a second preset range, determining one or more kurtosis coefficients in directions corresponding to the one or more of the diffusion coefficients within the second preset range based on the elements of the first kurtosis tensor, wherein the second preset range is from a third preset threshold to a fourth preset threshold;
if one or more of the diffusion coefficients in each direction are outside the second preset range, determining that one or more kurtosis coefficients in directions corresponding to the one or more of the diffusion coefficients outside the second preset range are equal to a value within a third preset range, wherein the third preset range is from a fifth preset threshold to a sixth preset threshold; and
correcting the first kurtosis tensor based on the kurtosis coefficients in each direction to obtain elements of the second kurtosis tensor.

6. The method of claim 5, wherein, after the determining the one or more kurtosis coefficients in the directions corresponding to the diffusion coefficients within the second preset range based on the elements of the first kurtosis tensor, the method further includes:
if any of the determined kurtosis coefficients in the directions corresponding to the diffusion coefficients within the second preset range is outside the third preset range, correcting the determined kurtosis coefficient outside the third preset range to a value within the third preset range.

7. The method of claim 1, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
determining, based on the elements of the first diffusion tensor and direction vectors in each direction, diffusion coefficients in corresponding directions;
correcting the first diffusion tensor and the first kurtosis tensor based on the diffusion coefficients in each direction to obtain elements of a second diffusion tensor and elements of a second kurtosis tensor, respectively; and
determining the diffusion tensor imaging parameters and the kurtosis tensor imaging parameters based on the elements of the second diffusion tensor and the elements of the second kurtosis tensor.

8. The method of claim 7, wherein the correcting the first diffusion tensor and the first kurtosis tensor based on the diffusion coefficients in each direction to obtain the elements of the second diffusion tensor and the elements of the second kurtosis tensor, respectively, includes:
if one or more of the diffusion coefficients in each direction are outside a fifth preset range, correcting the one or more of the diffusion coefficients outside the fifth preset range to a value within the fifth preset range, wherein the fifth preset range is from a ninth preset threshold to a tenth preset threshold;
correcting the first diffusion tensor based on target diffusion coefficients to obtain the elements of the second diffusion tensor, wherein the target diffusion coefficients comprise the corrected one or more of diffusion coefficients and one or more of the diffusion coefficients in each direction that are within the fifth preset range;
determining kurtosis coefficients in the directions corresponding to the target diffusion coefficients; and
determining the elements of the second kurtosis tensor based on the kurtosis coefficients in the directions corresponding to the target diffusion coefficients.

9. The method of claim 8, wherein the determining the kurtosis coefficients in the directions corresponding to the target diffusion coefficients includes:
determining one or more of the kurtosis coefficients in directions corresponding to uncorrected diffusion coefficients among the target diffusion coefficients based on the elements of the first kurtosis tensor; and
determining that one or more of the kurtosis coefficients in directions corresponding to corrected diffusion coefficients among the target diffusion coefficients are equal to a value within a sixth preset range, wherein the sixth preset range is from an eleventh preset threshold to a twelfth preset threshold.

10. The method of claim 9, wherein, after the determining the one or more of the kurtosis coefficients in directions corresponding to uncorrected diffusion coefficients among the target diffusion coefficients based on the elements of the first kurtosis tensor, the method further includes:
if any of the determined kurtosis coefficients in the directions corresponding to the uncorrected diffusion coefficients among the target diffusion coefficients is outside the sixth preset range, correcting the determine kurtosis coefficient outside the sixth preset range to a value within the sixth preset range.

11. The method of claim 1, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
determining, based on elements of the first kurtosis tensor and direction vectors in each direction, kurtosis coefficients in corresponding directions;
if one or more of the kurtosis coefficients in each direction are outside a fourth preset range, correcting the one or more of the kurtosis coefficients outside the fourth preset range to a value within the fourth preset range;
correcting the first kurtosis tensor based on the kurtosis coefficients in each direction to obtain elements of a second kurtosis tensor; and
determining the at least one type of parameters of diffusion tensor imaging parameters or kurtosis tensor imaging parameters based on the elements of the first diffusion tensor and the elements of the second kurtosis tensor.

12. The method of claim 1, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and the elements of the second kurtosis tensor includes:
  determining, based on the elements of the first diffusion tensor and direction vectors in each direction, diffusion coefficients in corresponding directions;
  correcting the first diffusion tensor based on the diffusion coefficients in each direction to obtain elements of a second diffusion tensor;
  determining, based on the elements of the first kurtosis tensor and direction vectors in each direction, kurtosis coefficients in corresponding directions;
  correcting the first kurtosis tensor based on the kurtosis coefficients in each direction to obtain elements of a second kurtosis tensor; and
  determining the at least one type of parameters of diffusion tensor imaging parameters or kurtosis tensor imaging parameters based on the elements of the second diffusion tensor and the elements of the second kurtosis tensor.

13. A computer device, comprising a memory and a processor, the memory having computer instructions stored thereon, wherein the processor, when executing the computer instructions, is configured to:
  acquire scan image signals of a scanned object;
  fit the scan image signals using an unconstrained optimization algorithm to obtain elements of a first diffusion tensor and elements of a first kurtosis tensor;
  determine at least one type of parameters of diffusion tensor imaging parameters or kurtosis tensor imaging parameters based on the elements of the first diffusion tensor and the elements of the first kurtosis tensor, wherein the diffusion tensor imaging parameters include at least one of diffusion coefficients in each direction, a mean diffusion coefficient, an axial diffusion coefficient, a radial diffusion coefficient, or a diffusion anisotropy coefficient, and the kurtosis tensor imaging parameters include at least one of kurtosis coefficients in each direction, a mean kurtosis coefficient, an axial kurtosis coefficient, a radial kurtosis coefficient, or a kurtosis anisotropy coefficient; and
  generate a parameter image based on the at least one type of parameters of diffusion tensor imaging parameters or kurtosis tensor imaging parameters,
  wherein determining the at least one type of parameters of the diffusion tensor imaging parameters or the kurtosis tensor imaging parameters based on the elements of the first diffusion tensor and the elements of the first kurtosis tensor comprising:
  calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor.

14. The computer device of claim 13, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
  determining, based on the elements of the first diffusion tensor and direction vectors in each direction, diffusion coefficients in corresponding directions;
  correcting the first diffusion tensor based on the diffusion coefficients in each direction to obtain elements of a second diffusion tensor; and
  determining the at least one type of parameters of diffusion tensor imaging parameters or kurtosis tensor imaging parameters based on the elements of the second diffusion tensor and the elements of the first kurtosis tensor.

15. The computer device of claim 14, wherein the correcting the first diffusion tensor based on the diffusion coefficients in each direction to obtain the elements of the second diffusion tensor includes:
  if one or more of the diffusion coefficients in each direction are outside a first preset range, correcting the one or more of the diffusion coefficients outside the first preset range to a value within the first preset range, wherein the first preset range is from a first preset threshold to a second preset threshold; and
  correcting the first diffusion tensor based on the corrected one or more of the diffusion coefficients and one or more remaining diffusion coefficients to obtain the elements of the second diffusion tensor, wherein the one or more remaining diffusion coefficients comprise one or more of the diffusion coefficients in each direction that are within the first preset range.

16. The computer device of claim 13, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
  determining, based on the elements of the first diffusion tensor and direction vectors in each direction, diffusion coefficients in corresponding directions;
  correcting the first kurtosis tensor based on the diffusion coefficients in each direction to obtain elements of a second kurtosis tensor; and
  determining the at least one type of parameters of diffusion tensor imaging parameters or kurtosis tensor imaging parameters based on the elements of the first diffusion tensor and the elements of the second kurtosis tensor.

17. The computer device of claim 16, wherein the correcting the first kurtosis tensor based on the diffusion coefficients in each direction to obtain the elements of the second kurtosis tensor includes:
if one or more of the diffusion coefficients in each direction are within a second preset range, determining one or more kurtosis coefficients in directions corresponding to the one or more of the diffusion coefficients within the second preset range based on the elements of the first kurtosis tensor, wherein the second preset range is from a third preset threshold to a fourth preset threshold;
if one or more of the diffusion coefficients in each direction are outside the second preset range, determining that one or more kurtosis coefficients in directions corresponding to the one or more of the diffusion coefficients outside the second preset range are equal to a value within a third preset range, wherein the third preset range is from a fifth preset threshold to a sixth preset threshold; and
correcting the first kurtosis tensor based on the kurtosis coefficients in each direction to obtain elements of the second kurtosis tensor.

18. The computer device of claim 17, wherein, after determining the one or more kurtosis coefficients in the directions corresponding to the diffusion coefficients within the second preset range based on the elements of the first kurtosis tensor, the method further includes:
if any of the determined kurtosis coefficients in the directions corresponding to the diffusion coefficients within the second preset range is outside the third preset range, correcting the kurtosis coefficient outside the third preset range to a value within the third preset range.

19. The computer device of claim 13, wherein calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor includes:
determining, based on the elements of the first diffusion tensor and direction vectors in each direction, diffusion coefficients in corresponding directions;
correcting the first diffusion tensor and the first kurtosis tensor based on the diffusion coefficients in each direction to obtain elements of a second diffusion tensor and elements of a second kurtosis tensor, respectively; and
determining the diffusion tensor imaging parameters and the kurtosis tensor imaging parameters based on the elements of the second diffusion tensor and the elements of the second kurtosis tensor.

20. A non-transitory computer readable storage medium having computer instructions stored thereon, wherein the computer instructions, when executed by a processor, cause the processor to:
acquire scan image signals of a scanned object;
fit the scan image signals using an unconstrained optimization algorithm to obtain elements of a first diffusion tensor and elements of a first kurtosis tensor;
determine at least one type of parameters of diffusion tensor imaging parameters or kurtosis tensor imaging parameters based on the elements of the first diffusion tensor and the elements of the first kurtosis tensor, wherein the diffusion tensor imaging parameters include at least one of diffusion coefficients in each direction, a mean diffusion coefficient, an axial diffusion coefficient, a radial diffusion coefficient, or a diffusion anisotropy coefficient, and the kurtosis tensor imaging parameters include at least one of kurtosis coefficients in each direction, a mean kurtosis coefficient, an axial kurtosis coefficient, a radial kurtosis coefficient, or a kurtosis anisotropy coefficient; and
generate a parameter image based on the at least one type of parameters of diffusion tensor imaging parameters or kurtosis tensor imaging parameters,
wherein determining the at least one type of parameters of the diffusion tensor imaging parameters or the kurtosis tensor imaging parameters based on the elements of the first diffusion tensor and the elements of the first kurtosis tensor comprising:
calculating diffusion coefficients in each direction and/or kurtosis coefficients in each direction based on the elements of the first diffusion tensor and the elements of the first kurtosis tensor, correcting the diffusion coefficients and/or the kurtosis coefficients outside preset ranges to obtain elements of a second diffusion tensor and/or elements of a second kurtosis tensor, and determining the diffusion tensor imaging parameters and/or the kurtosis tensor imaging parameters based on the elements of the second diffusion tensor and/or the elements of the second kurtosis tensor.

* * * * *